US012424745B2

(12) United States Patent
Legay et al.

(10) Patent No.: US 12,424,745 B2
(45) Date of Patent: Sep. 23, 2025

(54) DEVICE FOR CONTROLLING RF ELECTROMAGNETIC BEAMS ACCORDING TO THEIR FREQUENCY BAND, AND MANUFACTURING METHOD

(71) Applicants: THALES, Courbevoie (FR); UNIVERSITE DE RENNES, Rennes (FR); INSA DE RENNES, Rennes (FR); NANTES UNIVERSITE, Nantes (FR); CENTRALESUPELEC, Gif sur Yvette (FR); CENTRE NATIONAL DE LA RECHERCHE SCIENTIFIQUE, Paris (FR)

(72) Inventors: Hervé Legay, Plaisance du Touch (FR); Charalampos Stoumpos, Toulouse (FR); Thierry Pierre, Saint Julien sur Garonne (FR); Juan Duran Venegas, Toulouse (FR); Maria Garcia Vigueras, Rennes (FR)

(73) Assignees: THALES, Courbevoie (FR); UNIVERSITE DE RENNES, Rennes (FR); INSA DE RENNES, Rennes (FR); NANTES UNIVERSITE, Nantes (FR); CENTRALESUPELEC, Gif sur Yvette (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 201 days.

(21) Appl. No.: 18/134,682

(22) Filed: Apr. 14, 2023

(65) Prior Publication Data

US 2023/0335899 A1 Oct. 19, 2023

(30) Foreign Application Priority Data

Apr. 14, 2022 (FR) ...................................... 2203458

(51) Int. Cl.
*H01Q 3/46* (2006.01)

(52) U.S. Cl.
CPC .................................... *H01Q 3/46* (2013.01)

(58) Field of Classification Search
CPC ............................. H01Q 3/46; H01Q 15/0013
See application file for complete search history.

(56) References Cited

U.S. PATENT DOCUMENTS 4,672,334 A * 6/1987 Saad .......................... H01P 1/17 333/157
8,933,855 B2 * 1/2015 Nelson ................. H01Q 15/246 343/756

(Continued)

FOREIGN PATENT DOCUMENTS

CN 110943301 A * 3/2020
EP 2 912 721 B1 12/2017
FR 3 095 303 A1 10/2020

OTHER PUBLICATIONS

Behdad, et al., "A Low-Profile Third-Order Bandpass Frequency Selective Surface", IEEE Transactions on Antennas and Propagation, vol. 57, No. 2, pp. 460-466, 2009.

(Continued)

*Primary Examiner* — Dameon E Levi
*Assistant Examiner* — Jordan E. DeWitt
(74) *Attorney, Agent, or Firm* — BakerHostetler

(57) ABSTRACT

A device for controlling radiofrequency beams of a given polarization, the device includes a set of at least one cell, comprising a support frame and at least one interconnection internal to the frame. The frame is inscribed within a prism, having a given axis Z' and $\mathcal{N}$ faces connected to one another by $\mathcal{N}$ edges oriented along the axis Z'. The frame comprises $\mathcal{N}$ corner elements, each having a rim coincident with an edge and being arranged such that the frame has, on each face, a slot (440-*n*) extending along the axis Z'.

(Continued)

The interconnection $\mathcal{N}$ comprises inductive rods, each comprising two ends of which a first end is connected to a rim, the second ends being connected to one another at a connection point positioned in the centre of the frame in a plane orthogonal to the axis Z'. Each cell is configured to carry out polarization-invariant transmission and/or reflection of beams.

16 Claims, 12 Drawing Sheets

(56) References Cited

U.S. PATENT DOCUMENTS

2003/0234745 A1* 12/2003 Choung ............... H01Q 19/192
343/781 CA
2014/0118218 A1* 5/2014 Jordan ............... H01Q 15/0086
343/872
2015/0236416 A1* 8/2015 Fonseca ............. H01Q 15/0033
343/837
2017/0273196 A1* 9/2017 Ehrenberg .............. C23C 14/20
2020/0028262 A1* 1/2020 Fang ......................... H01Q 3/46
2020/0335842 A1* 10/2020 Legay .................. H01Q 15/242
2021/0041699 A1* 2/2021 Ukai ........................ H04N 5/64

OTHER PUBLICATIONS

Vogel, et al., "Transmission and reflection of metallic mesh in the far infrared", Infrared Physics, vol. 4, pp. 257-262, 1964.

Marchetti, et al., "Upgrade to the K-band uplink channel for the ESA Deep Space Antennas: Analysis of the optics and preliminary dichroic mirror design", 14th European Conference on Antennas and Propagation (EuCAP), 2020.

Tang, et al., "Waveguide 3-D FSSs by 3-D printing technique", International Conference on Electromagnetics in Advance Applications (ICEAA), 2016.

Molero, et al., "Circuit Modeling of 3-D Cells to Design Versatile Full-Metal Polarizers", IEEE Transactions on Microwave Theory and Techniques, vol. 67, pp. 1357-1369,2019.

* cited by examiner

Fig. 7

Sequences of loads

| Inductive | Inductive and Capacitive | |
|---|---|---|
| L | | Order 1 |
| LL | | Order 2 |
| LLL | LCL | Order 3 |
| LLLL | | Order 4 |
| LLLLL | LCLCL | Order 5 |
| ... | | ... |
| ... | | Order p |

DEVICE FOR CONTROLLING RF ELECTROMAGNETIC BEAMS ACCORDING TO THEIR FREQUENCY BAND, AND MANUFACTURING METHOD

CROSS-REFERENCE TO RELATED APPLICATION

This application claims priority to foreign French patent application No. FR 2203458, filed on Apr. 14, 2022, the disclosure of which is incorporated by reference in its entirety.

FIELD OF THE INVENTION

The present invention relates in general to the radiofrequency (RF) domain, and in particular to a device for controlling RF electromagnetic beams according to their frequency band, notably for controlling the reflection and/or the transmission of electromagnetic beams, and to a method for manufacturing such a device. One example of a control device is described in patent FR 3095303 B1.

BACKGROUND

Devices for controlling the reflection and/or the transmission of beams coming from RF electromagnetic signal sources, according to their frequency band, also called “RF dichroic screens”, may consist of frequency-selective surfaces (FSS). Such surfaces are formed of a stack of two or more periodic surfaces, themselves designed based on metal patterns that are distributed regularly according to a periodicity vector, etched or printed on a dielectric substrate.

The metal patterns that are usually chosen are annular patterns so as to form resonant elements the interaction of which with RF electromagnetic signals is modelled according to a circuit comprising a coil (defined by an inductance L) and a capacitor (defined by a capacitance C), with a predominant capacitive portion. These periodic surfaces are said to be ‘capacitive’. An RF dichroic screen designed based on such capacitive surfaces reflects in a high frequency band and transmits in a lower frequency band, and so it is conventionally used as a low-pass (or notch) filter.

However, when a source emits RF electromagnetic signals, the RF powers of the emitted beams are usually not as high in a high frequency band as in a lower frequency band. The reflection phenomenon leads to fewer power losses in comparison with the transmission phenomenon. Therefore, to minimize the power dissipated within the structure, it is desirable for an RF dichroic screen to reflect an RF signal having a low frequency band. The RF signal then barely penetrates into the RF dichroic screen, and is less likely to be affected by ohmic losses (that is to say power losses). To this end, it is known to use an RF dichroic screen behaving like a highly reflective metal sheet for the low frequency band.

Moreover, a degraded surface condition of an RF dichroic screen produces more interference on the wavefront of a reflected RF beam than on the wavefront of a transmitted RF beam. However, the production of this interference is greater fora high frequency band than for a lower frequency band. It is thus also desirable for the RF dichroic screen to behave like a high-pass filter, therefore operating transparently in a high frequency band.

The dielectric substrates forming these periodic surfaces furthermore lead to transmitted RF beam ohmic losses that are able to be minimized, but are not able to be cancelled out.

Moreover, the increase in the number of capacitive periodic surfaces forming such an RF dichroic screen used as notch filter may make it possible to expand the frequency passband of the transmitted RF beam. However, considering that an RF beam to be transmitted has a non-zero angle of incidence with respect to the normal of the RF dichroic screen, the thicker the structure of the RF dichroic screen (that is to say the greater the number of periodic surfaces), the more sensitive this structure becomes to this angle of incidence. The thickness of the structure and of the spacings between the periodic surfaces changes in a manner inversely proportional to the cosine of the angle of incidence of the RF beam to be transmitted, as described in the article “A Low-Profile Third-Order Bandpass Frequency Selective Surface” by N. Behdad et al. Antennas and Propagation, IEEE Transactions on, 2009, pages 460-466.

It is also known to use RF dichroic screens formed of perforated sheets. Such RF dichroic screens are commonly used as bandpass filters. These perforated sheets consist of metal foils that are perforated with a given periodicity, with rectangular or circular holes, as described in the article “Transmission and reflection of metallic mesh in the far infrared” by P. Vogel et al. Infrared Physics, 1964, vol. 4, pp. 257-262.

The perforations act as waveguides for RF electromagnetic beams of wavelength $\lambda$, for which the RF dichroic screen should be transparent. These perforations must be wide enough for an electromagnetic mode to be able to be established there. The periodicity associated with these perforations is typically of the order of $0.75\lambda$. However, grating lobes may be excited there for beams with a large aperture angle and/or having a non-zero angle of incidence with respect to the normal of the RF dichroic screen. The periodicity of these perforations thus constitutes a first constraint, due to the fact that it limits the angle of incidence for which the RF dichroic screen is able to be used and/or the aperture angle of the RF beam (since it results in significant losses for an excessively wide angular sector, for example greater than 40°).

A second constraint corresponds to the effects of partial reflections, within the planes, from discontinuities, for beams in transmission mode in these waveguides. These partial reflections depend on the amount of metal forming the perforated sheets and are greater when the metal walls are thicker. The partial reflections at input and at output of the waveguides may be compensated for at a given frequency, by adjusting the length of the guided sections. However, around this given frequency and over an angular sector, the recombination of the partial reflections produces ripple in the frequency band, which may reach several tens of dB.

Finally, considering that RF sources produce RF electromagnetic waves in TEM (transverse electromagnetic) mode, a third constraint linked to these perforations is linked to the fact that the reflection and transmission coefficients of such RF dichroic screens depend on the TE or TM polarization of the incident wave.

One conventional solution for addressing the constraints associated with these perforations is that of reducing periodicity by considering propagation in dielectric media. This however results in significant dielectric losses and increased complexity of the manufacturing process.

Polarization invariance of RF dichroic screens is an important requirement. Indeed, the polarization (in particular circular polarization) of the wave transmitted or reflected by the screen should not be disrupted, or should be disrupted only slightly, in order to avoid bringing about significant losses of non-negligible changes on the basis of the angle of incidence of the beam, as described in the article "Upgrade to the K-band uplink channel for the ESA Deep Space Antennas: Analysis of the optics and preliminary dichroic mirror design" by M. Marchetti et al. 14th European Conference on Antennas and Propagation (EuCAP), Copenhagen, Denmark, 2020.

It is also known to improve certain properties of RF dichroic screens using RF electromagnetic waveguides having what is known as a "below-cutoff" structure, that is to say allowing propagation of a guided mode only beyond the cutoff frequency, which is greater than the desired operating frequency.

To manufacture such waveguides, the walls of the perforations have slots in order to produce frequency windows for transmission at the resonant frequency of the slots, as described in the article "Waveguide 3-D FSSs by 3-D printing technique" by T. Wang et al. International Conference on Electromagnetics in Advance Applications (ICEAA), Cairns, Australia, 2016.

The waveguides that are thus created therefore operate with a far lower periodicity, typically of the order of 0.5λ, in the frequency band λ for which the RF dichroic screen should be transparent. The slots may adopt multiple shapes, as described in the article "Circuit Modeling of 3-D Cells to Design Versatile Full-Metal Polarizers" by C. Molero et al. IEEE Transactions on Microwave Theory and Techniques, 2019, vol. 67, pp. 1357-1369.

However, the structure of these waveguides is highly resonant, and therefore limits the bandwidth of the transmitted RF beam. To expand the passband, it is then necessary to add resonators to the walls. This results in a structure having a large thickness compared to the wavelength of the frequency bands. This thickness gives excessively high sensitivity with respect to the angular sector, that is to say the aperture angle of the RF beams and/or the angle of incidence of the beams with respect to the normal of the RF dichroic screen.

Such RF dichroic screens are nevertheless completely metal and therefore suited to applications with high-power beams. However, as described above, the metal RF dichroic screens known to a person skilled in the art have responses that depend on the polarization of the beams and are not stable over a wide passband and over a wide angle of incidence sector (notably limited to a beam with an aperture angle of ±5° about an angle of incidence of 30° for example).

There is thus a need for an improved device for controlling beams of RF electromagnetic waves in TEM (transverse electromagnetic) mode according to their frequency band.

SUMMARY OF THE INVENTION

The present invention aims to improve the situation by proposing a device for controlling radiofrequency beams, comprising a set of at least one cell, the cell comprising a support frame and at least one interconnection internal to the support frame, the radiofrequency beams being TEM electromagnetic waves having a given polarization. Advantageously, the support frame is inscribed within a prism, having a given axis Z', the prism comprising $\mathcal{N}$ faces $\mathcal{P}_n$ connected to one another by $\mathcal{N}$ edges $\mathcal{A}_n$, oriented along the axis of the prism Z', the support frame comprising $\mathcal{N}$ corner elements, each corner element having a rim coincident with one of the edges of the prism, the corner elements being arranged such that the support frame has, on each face of the prism, a slot extending along the axis of the prism Z'. Each internal interconnection comprises $\mathcal{N}$ inductive rods each comprising two ends, the inductive rods each having a first end connected to one of the rims of the support frame, the second ends of the inductive rods being connected to one another at a rod connection point, the rod connection point being positioned substantially in the centre of the support frame in a plane orthogonal to the axis of the prism Z'. Each cell is configured to carry out polarization-invariant transmission and/or reflection of radiofrequency beams of the TEM electromagnetic waves.

In one particular embodiment, a cell may comprise at least two internal interconnections and also at least one capacitive plate internal to the support frame and extending in a plane orthogonal to the axis of the prism Z', the at least one capacitive plate being arranged between the two internal interconnections.

According to some embodiments, a cell may comprise at least two internal interconnections and also at least one central pillar extending along the axis of the prism Z' and being arranged substantially in the centre of the support frame, the central pillar comprising an upper end connected to the rod connection point of one of the internal interconnections, and a lower end connected to the rod connection point of another internal interconnection.

Advantageously, the at least one capacitive plate may be connected to the support frame by at least one central pillar extending along the axis of the prism Z' and comprising an upper end and a lower end, the capacitive plate being arranged substantially in the middle of the central pillar.

The at least one capacitive plate may be kept within the support frame by way of a dielectric support.

The device for controlling radiofrequency beams may be formed of a single electrically conductive material.

In particular, the number $\mathcal{N}$ may be equal to 4, while the support frame has a square parallelepipedal shape, or the number $\mathcal{N}$ may be equal to 6, while the support frame has a hexagonal prism shape.

The device for controlling radiofrequency beams may be defined in a coordinate system (X,Y,Z) and generally extend in a plane (X,Y), and the axis of the prism Z' may be parallel to the axis Z, the support frame having a right prism shape.

As an alternative, the device for controlling radiofrequency beams may be defined in a coordinate system (X,Y,Z) and generally extend in a plane (X,Y), and the axis of the prism Z' may have an incline β with respect to the axis Z, the support frame having an oblique prism shape.

In some embodiments, the inductive rods and the edges of the support frame may form an angle γ between 45° and 90°, and/or between 90° and 135°.

The device for controlling radiofrequency beams may be defined in a coordinate system (X,Y,Z), generally extend in a plane (X,Y), and comprise a set of multiple cells having variable geometric shapes and dimensions in the plane (X,Y).

The invention also provides an optical system comprising at least one first radiofrequency signal source configured to emit a radiofrequency beam of frequency band $\lambda_1$ in a given propagation direction and a device for controlling RF beams, the device for controlling radiofrequency beams being configured to reflect and/or transmit the radiofrequency beam in the given propagation direction and the frequency band $\lambda_1$.

In some embodiments, the optical system may comprise at least two radiofrequency signal sources, the sources comprising a second source configured to emit a radiofrequency beam of frequency band $\lambda_2$ in a given propagation direction, the device for controlling radiofrequency beams being defined in a coordinate system (X,Y,Z) and generally extending in a plane (X,Y), the control device being configured to reflect radiofrequency signals of frequency band $\lambda_1$ and transmit radiofrequency signals of frequency band $\lambda_2$, the device for controlling radiofrequency beams being positioned between the sources, the axis Z having an angle of incidence $\alpha_i$ with respect to the sources, for example $\alpha_i=30°$.

The radiofrequency beam emitted by the first source may be a TEM electromagnetic wave having a given phase, and the device for controlling radiofrequency beams may be defined in a coordinate system (X,Y,Z) and generally extend in a plane (X,Y), the control device comprising a set of multiple cells, the device for controlling radiofrequency beams being configured to modify the phase in the plane (X,Y).

The invention also provides a method for manufacturing the device for controlling radiofrequency beams, the device being completely metal, and the manufacturing method using at least one 3D printing technique.

With the device for controlling radiofrequency beams comprising two faces defined in the plane (X,Y), the method may comprise a first step of depositing metal layers stacked in the direction of said incline $\beta$, and then a second step of cutting at least one of the two faces of the device.

The embodiments of the invention thus provide a device for controlling beams of RF electromagnetic waves in TEM mode, capable of being polarization-invariant, suitable for high-power RF signals, and behaving like a high-pass filter dichroic screen, that is to say operating in reflection mode in a low frequency band and so as to be transparent in a higher frequency band, with very low insertion losses, for large angular sectors of the incident RF beams.

The device according to the embodiments of the invention makes it possible to control beams of RF electromagnetic waves in TEM mode, according to their frequency band in a polarization-invariant manner. Such a device may for example be produced in the form of a high-pass filter dichroic screen, operating in reflection mode in a low frequency band (for example X band) and so as to be transparent in a higher frequency band (for example Ka band), with very low insertion losses.

Such a device is particularly suitable for new additive manufacturing methods, which improve the reflection and transmission performance of wide bands, with a large angular sector of the beams of the incident high-power RF electromagnetic signals.

BRIEF DESCRIPTION OF THE DRAWINGS

Other features, details and advantages of the invention will become apparent on reading the description given with reference to the appended drawings, which are given by way of example.

FIG. 7 is a table illustrating the construction of sequences of loads internal to a cell of the device for controlling RF beams, according to some modes of the invention.

Identical references are used in the figures to denote identical or similar elements. For the sake of clarity, the elements that are shown are not to scale.

DETAILED DESCRIPTION

Figure 1:
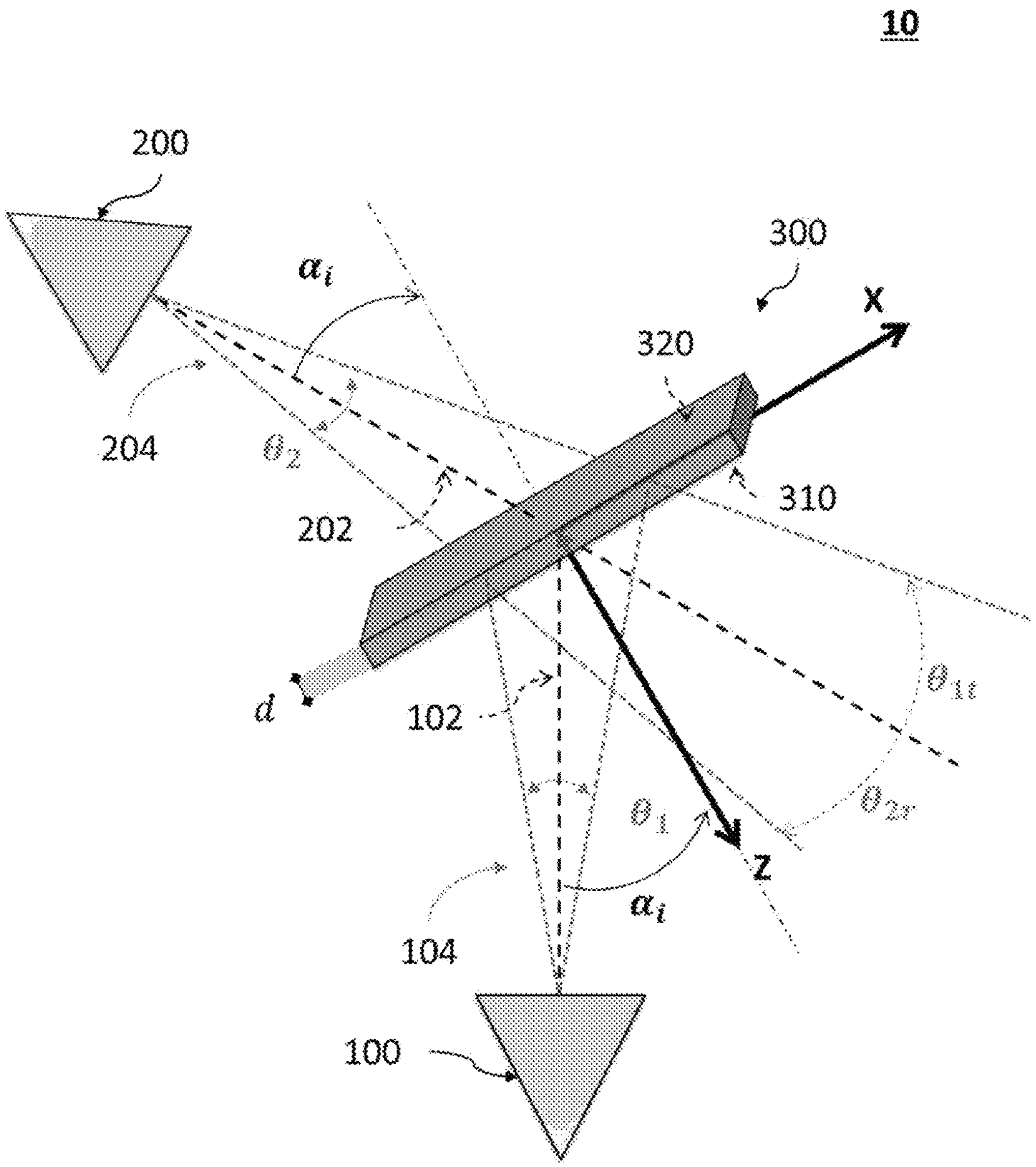
FIG. 1 is a diagram showing an optical system comprising a device for controlling radiofrequency beams, according to some embodiments of the invention.

FIG. 1 shows an optical system 10 comprising a device 300 for controlling radiofrequency (RF) beams, according to some embodiments of the invention.

The device 300 for controlling radiofrequency beams may be for example used as a dichroic screen in an optical system 10 implemented in an antenna system (not shown) comprising a large reflector associated with multiple radiofrequency (RF) electromagnetic signal sources, which may have a very high power (for example of the order of several tens of kilowatts).

For example and without limitation, such an antenna system may be implemented in the form of an antenna mounted on board a satellite or a ground control station antenna, for space and/or scientific missions.

As used here, the term "controlling radiofrequency beams" (also called 'manipulating radiofrequency beams') refers to various phenomena related to electromagnetic waves that may take place when an RF beam interacts with the material of a given object, such as the device 300. These phenomena comprise notably transmission, reflection, absorption, scattering, refraction and/or diffraction of the electromagnetic wave.

Moreover, when using the device 300 for controlling RF beams as a dichroic screen, transmission screen and/or reflection screen, in an antenna system, the device 300 for controlling RF beams may be used to transmit and/or reflect beams coming from separate RF signal sources each having a separate frequency band.

An antenna system may comprise various optical systems forming one or more "optical paths" and making it possible to control (notably manipulate and/or direct) the RF signals produced by the sources positioned at various locations of the antenna system (depending on size) towards the reflector.

Conventionally, these optical systems limit the design of the antenna system since they may lead to large power losses of the RF signals and constrain the architecture of the antenna system by limiting for example the width of the beams (or angular aperture) produced by the RF sources.

In the exemplary embodiment shown in FIG. 1, the optical system 10 forms part of an antenna system (not shown) and comprises a first RF source 100, a second RF source 200 and a device 300 for controlling RF beams.

The two RF sources 100, 200 are configured to emit beams of electromagnetic waves in TEM (acronym for transverse electromagnetic, associated with transverse electromagnetic waves) mode in two separate RF frequency bands, respectively denoted $\lambda_1$ and $\lambda_2$, and along two given propagation axes, respectively denoted 102 and 104. An electromagnetic wave of an emitted RF beam is also characterized by a given phase (and an associated wavefront). For example, the RF sources 100, 200 may be configured to emit in specific frequency bands such that $\lambda_1$ corresponds to the band called "X band", of low frequencies, typically between 7 GHz and 8.5 GHz, and $\lambda_2$ corresponds to the band called "Ka band", of high frequencies, typically between 22.5 GHz and 27 GHz.

The device 300 for controlling RF beams is therefore defined in a coordinate system (X,Y,Z). According to the embodiments of the invention, the device 300 for controlling RF beams comprises at least two faces, denoted 310 and 320. The two faces 310 and 320 are spaced from one another by a distance d representing the 'thickness' of the device 300 for controlling RF beams. For example, and without limitation, the thickness d may be greater than or equal to a value substantially equal to $\lambda_1/2$. For example and without limitation, the thickness d may be equal to 5.5 mm. Since this thickness value d is very small compared to the overall size of the optical system 10, the device 300 for controlling RF beams may have a substantially flat structure, defined in the plane (X,Y) associated with the coordinate system (X,Y,Z) and orthogonal to the axis Z. The device 300 for controlling RF beams thus generally extends in the plane (X,Y).

The device 300 for controlling RF beams may be used as a dichroic screen so as to superimpose the beams from the RF sources 100, 200 on one and the same optical path of the antenna system. The dichroic screen 300 makes it possible, on the one hand, to reflect the beam from the low-frequency RF source 100 and, on the other hand, to transmit the beam from the high-frequency RF source 200. Thus, in the example of FIG. 1, the device 300 for controlling RF beams may be positioned between the two RF sources 100, 200, such that:

- the RF source 100 emits the RF beam along the propagation axis 102 directed towards the face 310 from which the beam is reflected, and
- the RF source 200 emits the RF beam along the propagation axis 202 directed towards the face 320. The RF beam from the RF source 100 then passes through the device 300 for controlling RF beams, and therefore the two faces 310 and 320.

As shown in FIG. 1, in some modes of application, the RF sources 100, 200 may be of horn type and may be associated respectively with beams with a radiation field 104, 204, each defined according to an aperture angle respectively denoted $\theta_1$ and $\theta_2$. The device 300 for controlling RF beams may furthermore be configured to modify or not modify the aperture angle (that is to say the associated phase and wavefront) of the transmitted and/or reflected radiation fields, respectively denoted $\theta_{1t}$ and $\theta_{2t}$. For example, and without limitation, the two RF sources 100, 200 may have a radiation field 104, 204 having the same aperture angle denoted θ, before and after interaction with the device 300 for controlling RF beams. The angle θ may for example be of the order of 30°. It should be noted that the RF sources 100, 200 may furthermore be associated with a spherical wavefront that will be transformed into a planar wavefront by another optical system, for example.

In some embodiments of the invention, the device 300 for controlling RF beams may be inclined with respect to the average direction of incidence (that is to say propagation direction 102 and 202) of the beam at the spherical wavefront of two RF sources 100 and 200, for example so as to form an arrangement of the sources that does not generate any masking. The average direction of incidence of the beams with the normal axis Z of the device 300 then forms an angle of incidence denoted $\alpha_i$, for example substantially equal to 30°.

As a result, the projection of the radiation fields 104 and 204 of the RF sources onto the dichroic screen may vary with a very wide angular sector depending on the aperture angle θ and on the angle of incidence $\alpha_i$ of the RF sources 100 and 200. The dichroic screen is then configured to operate for highly oblique incidences, for example for angular sectors between 15° and 45°.

In other exemplary embodiments, the optical system 10 may comprise the device 300 for controlling RF beams and one or more RF sources 200 or 100 positioned respectively in transmission mode or in reflection mode with respect to the device 300, at a zero angle of incidence, such that $\alpha_i$=0°. In these embodiments, the device 300 for controlling RF beams may be configured to transmit and/or reflect an RF beam, and modify the phase (and the associated wavefront) of the electromagnetic wave of the RF beam. Such a configuration is applicable to devices 300 for controlling RF beams that are used as a transmission screen (or transmitarray) and/or a reflection screen (or reflectarray) to correct aberrations of multibeam optical systems. In particular, the device 300 for controlling radiofrequency beams generally extending in a plane (X,Y) may have variable geometric shapes and dimensions in the plane (X,Y), making it possible to modify the phase of the electromagnetic wave in the plane (X,Y).

For example and without limitation, the RF sources 100, 200 may furthermore be associated with a spherical and/or planar wavefront and/or a wavefront comprising deformations such as aberrations generated by phase offsets. The device 300 for controlling RF beams may thus be configured to transform a given wavefront (for example a spherical one) into another wavefront (for example a planar one) and/or to correct wavefront aberrations by locally modifying the phase of the RF beam in the plane (X,Y). The device 300 for controlling RF beams may moreover be configured to modify the wavefront of a wave intended to be reflected (coming from the source 100) differently from the wavefront of a wave intended to be transmitted (coming from the source 200). The resulting optical system 10 may comprise RF sources positioned closer to the device 300 or arranged in a manner more suited to the targeted application.

In one embodiment, the two faces 310 and 320 may be parallel to one another. In such an embodiment, the two faces 310 and 320 may be surfaces defined in two dimensions in the plane (X,Y) orthogonal to the normal axis Z. As a variant, the two faces 310 and 320 may be surfaces defined in three dimensions in the coordinate system (X,Y,Z). In these embodiments, the thickness d between the two parallel faces 310 and 320 is homogeneous along the device 300 for controlling RF beams.

As an alternative, the thickness d between the two faces 310 and 320 is non-homogeneous along the device 300 for controlling RF beams, such that the thickness d may vary along the axis X and/or along the axis Y. In this embodiment with a variable thickness, at least one of the two faces 310 and 320 may be defined as a surface defined in three dimensions in the coordinate system (X,Y,Z). For example and without limitation, the device 300 for controlling RF beams may comprise a centre O (not shown in the figures) positioned in the plane (X,Y), such that the thickness d varies in an increasing or decreasing manner from this centre O, along the axis X, so as to form a quasi-optical element, possibly being a concave or convex element, respectively.

The device 300 for controlling RF beams according to the embodiments of the invention comprises a set of cells 400 arranged in the plane (X,Y), as shown in FIGS. 2 to 4, 6 and 8 to 10.

Each cell 400 of the device 300 for controlling RF beams comprises an external cell support frame 420 and one or more internal interconnections 460.

Figure 2:
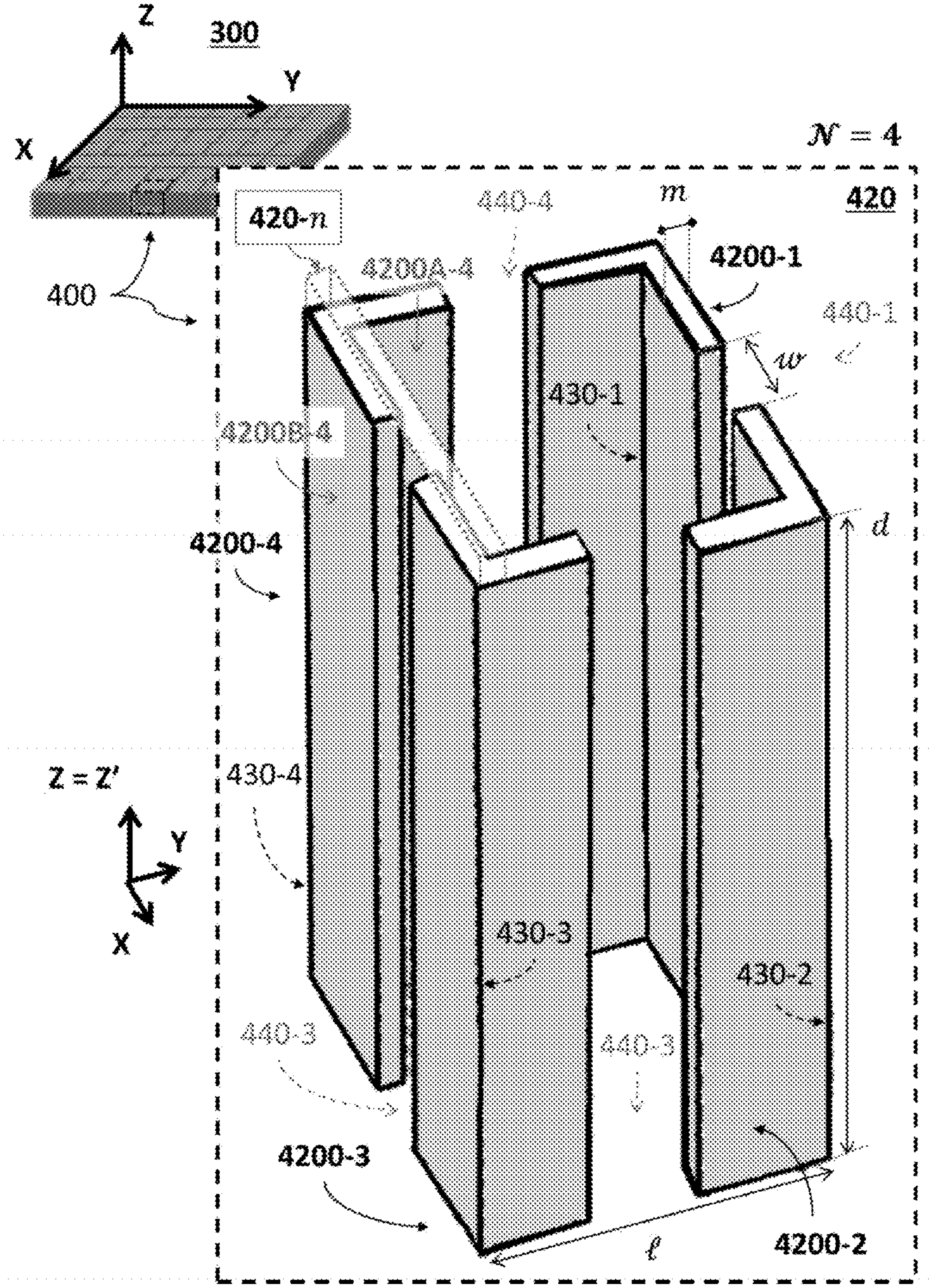
FIG. 2 is a diagram showing the support frame of a cell of the device for controlling radiofrequency beams according to some modes of the invention.

FIG. 2 shows only the external support frame 420 of a cell 400, so as to facilitate understanding of the invention.

The support frame 420 of a cell 400 (also called "cell support frame") is inscribed within a general shape of a prism (or cylinder with facets) having a main axis extending along an axis Z'. The axis Z' corresponds to a prism generatrix line and is also called "prism axis Z'". The cell support frame 420 has a length d along the axis Z'. In the exemplary embodiment in FIG. 2 (and also in FIGS. 3, 4, 6, 8 and 9), the axis Z' is equivalent to the axis Z. Such a prism is a polyhedron having faces formed by parallelograms, also called "prismatic faces", and two parallel polygonal bases. The prism shape may be, for example and without limitation, a square parallelepiped called a cuboid or a hexagonal prism.

The cell support frame 420 is thus inscribed within a general prism shape that is based on a polygonal base with $\mathcal{N}$ sides of width $\ell$, defined in the plane (X,Y), and extends along the axis of the prism Z'. The $\mathcal{N}$ prismatic faces $\mathcal{P}_n$ are connected to one another by $\mathcal{N}$ side edges $\mathcal{A}_n$ that are parallel to one another and parallel to the axis of the prism Z'.

n is an index associated with the various faces of the prism within which the cell support frame 420 is inscribed, with $n \in [1, \mathcal{N}]$. For example, if $\mathcal{N}$ is equal to 4, the prismatic faces comprise the faces $\mathcal{P}_1$, $\mathcal{P}_2$, $\mathcal{P}_3$ and $\mathcal{P}_4$ and the side edges comprise the edges $\mathcal{A}_1$, $\mathcal{A}_2$, $\mathcal{A}_3$ and $\mathcal{A}_4$.

As shown in FIG. 2, the cell support frame 420 comprises, on each side edge of the prism, a corner element 4200-*n* arranged in the corner of the prism corresponding to the side edge $\mathcal{A}_n$. A corner element 4200-*n* consists of two rectangular sheets 4200A-n and 4200B-n connected at a rim 430-*n* coincident with the side edge $\mathcal{A}_n$ associated with the corner of the prism, each sheet having a length equal to the length d of the prism along the axis $\vec{d}$ (equivalent to the axis Z in FIGS. 2 to 4, 6, 8 and 9). Each of the two sheets 4200A-n and 4200B-n of a corner element 4200-*n* extends partially over one of the two adjacent prismatic faces $\mathcal{P}_n$ and $\mathcal{P}_{n+1}$ connected by the rim 430-*n* corresponding to the edge $\mathcal{A}_n$ associated with the corner of the prism. The width of a rectangular sheet 4200A-n or 4200B-n in the plane (X,Y) of the corner element is less than the width $\ell$ of a prismatic face.

The cell support frame 420 is thus inscribed within the prism and comprises $\mathcal{N}$ "walls" 420-*n* coincident with one of the $\mathcal{N}$ prismatic faces $\mathcal{P}_n$ of the prism of the cell support frame 420, each wall 420-*n* comprising a discontinuity defined by a slot 440-*n*, extending along the axis of the prism Z' (equivalent to the axis Z in FIGS. 2 to 4, 6, 8 and 9). A wall 420-*n* thus comprises two rectangular sheets, separated from one another by the slot 440-*n*, each of the two sheets belonging to two adjacent corner elements 4200-*n* and 4200-(*n*+1) for example. A wall 420-*n* of the cell support frame 420 thus comprises the two adjacent rectangular sheets 4200A-n and 4200B-n that extend over one and the same prismatic face $\mathcal{P}_n$ and are separate from the slot 440-*n*.

The $\mathcal{N}$ "walls" 420-*n* of the cell support frame 420 have a wall thickness denoted m. It should be noted that, in a device 300 for controlling RF beams comprising two or more cells 400, the wall thickness between two cells 400 may be defined as being equal to a value 2×m. Furthermore, each of the $\mathcal{N}$ wall slots 440-*n* has a width $w$ corresponding to the distance between the two rectangular sheets 4200A-n and 4200B-n of the wall that belong to the two adjacent corner elements. The $\mathcal{N}$ continuous slots 440-*n* may be median with respect to the walls 420-*n*, that is to say positioned substantially in the middle of the corresponding wall 420-*n*.

The angle between the two sheets 4200A-n and 4200B-n of a corner element 4200-*n* depends on the shape of the prism, and notably on the number of $\mathcal{N}$ sides of the polygonal base.

In the example of FIG. 2, the axis of the prism Z' is parallel to the axis Z and is such that the cell support frame 420 has a right prism shape. The angle of the rims 430-*n* corresponding to the edges $\mathcal{A}_n$ with the plane (X,Y) of the device 300 for controlling RF beams is thus a right angle.

As an alternative, the axis of the prism Z' may have an incline β with respect to the axis Z, such that the frame 420 has an oblique prism shape.

Moreover, the cell support frame 420 may be completely or partly metal so as to form $\mathcal{N}$ electrically conductive walls 420-*n*. The cell support frame 420, according to the embodiments of the invention, interrupted by the $\mathcal{N}$ slots on each of these faces, acts as a waveguide with parallel walls 420-*n*, allowing the propagation of the beam to be transmitted by the device 300 for controlling RF beams, coming from the second RF source 200.

Such cell support frames 420 interrupted by slots (or slotted) may thus operate as a transmission screen in all RF signal frequency bands, and may in particular be used for the L, S, C, Ku and Ka bands.

The set of cells 400 forms a periodic arrangement of waveguides whose size is small compared to the wavelength, denoted $\lambda_2$, associated with the frequency band of the beam coming from the RF source to be transmitted. In particular, the width $\ell$ of the cell support frame 420 may be determined such that $$\ell < \frac{\lambda_2}{3}.$$

It should be noted that the maximum value $\ell_{max}$ of the width $\ell$ may be determined such that $$\ell_{max} < \frac{\lambda_2}{2}.$$

In some embodiments, the thickness m of the $\mathcal{N}$ walls 420-*n* may be small and also be adjusted, for example minimized, so as to attenuate transmission losses of the beam from the RF source 200 at the interfaces between the air and the waveguide (at input, face 310 and/or at output, face 320), and also transmission losses over a given frequency band and angular sector that are proportional to the ratio $m/\ell$. Indeed, the reduction in the bandwidth and the reduction in the angular sector may be correlated with the amount of metal material forming the cell support frame 420. Minimizing the thickness m may additionally lead to minimization of the total weight of the device 300 for controlling RF beams, while still guaranteeing its rigidity. Advantageously, the thickness m of the walls 420-*n* is less than the wavelength $\lambda_2$, thereby making it possible to confer transmission stability on the beam from the RF source 200 with respect to the variation in the aperture angle θ incident on the device 300 for controlling RF beams. In particular, the thickness m of the $\mathcal{N}$ walls 420-*n* according to the modes of the invention may be between 250 μm and 500 μm. The thickness m of the $\mathcal{N}$ walls 420-*n* may furthermore be defined on the basis of the advantages and constraints associated with the process for manufacturing the device 300 for controlling RF beams. For example and without limitation, when the device is manufactured using an additive manufacturing process (or 3D printing technique), the wall thickness between two cells 400 of a device 300 for controlling RF beams may be equal to a value 2×m=500 m. When the device is manufactured using a traditional manufacturing process, the wall thickness between two cells 400 of a device 300 for controlling RF beams may be equal to a value 2×m=1 mm.

The opening in the cell support frames 420 at the $\mathcal{N}$ slots 440-*n* passing through the walls 420-*n* furthermore makes it possible to simulate a dielectric material and significantly expand the transmission band of the device 300 for controlling RF beams.

The width $w$ of the slots 440-*n* may notably be between a minimum value, denoted $w_{min}$, and a maximum value, denoted $w_{max}$. For example and without limitation, the minimum value $w_{min}$ and the maximum value $w_{max}$ of the width of the slots 440-*n* may be defined on the basis of the width $\ell$ of the cell support frame 420 and/or the thickness m of the walls 420-*n*, according to the following equations (1) and (2):

$$w_{min} = m \quad (1)$$

$$w_{max} = \ell - (2 \times m) \quad (2)$$

The widths $w$ of the slots of one and the same cell 400 and/or of the slots of the set of cells 400 of the device 300 for controlling RF beams may be identical or variable depending on the modes of application of the invention. For example, and without limitation, a device 300 for controlling RF beams used to transmit and/or deflect and/or reflect an RF beam may comprise slot widths $w$ that vary (by a few micrometres for example) with respect to the centre O of the device 300 in order to spatially modulate the phase of the incident beam. The device 300 for controlling radiofrequency beams, generally extending in a plane (X,Y), may thus comprise a set of multiple cells 400 having variable geometric shapes and dimensions (for example the width $w$) in the plane (X,Y), making it possible to modify the phase (and the associated wavefront) of the electromagnetic wave in the plane (X,Y) in a very fine manner (at the level of the cell).

In some embodiments, a slot 440-*n* may be cut out (that is to say have a variable profile along the axis of the prism Z') at input (face 310) and/or at output (face 320) and/or along the section of the waveguide. These notches (not shown in the figures) and their dimensions, that is to say their length, their depth and their position, may differ depending on the slot 440-*n* under consideration in the cell 400 and/or in the plane (X,Y).

Using the cell support frame 420 as waveguide in transmission mode makes it possible not to introduce any frequency dispersion into the sections of the waveguide and to obtain very wideband responses for complete transmission of an incident RF beam.

Each cell 400 of the device 300 for controlling RF beams comprises one or more internal interconnections 460 having characteristics chosen so as to allow for example parameterization of the expansion of the frequency band of the beam coming from the first RF source 100 to be reflected and/or of the beam coming from the second RF source 200 to be transmitted.

Figure 3:
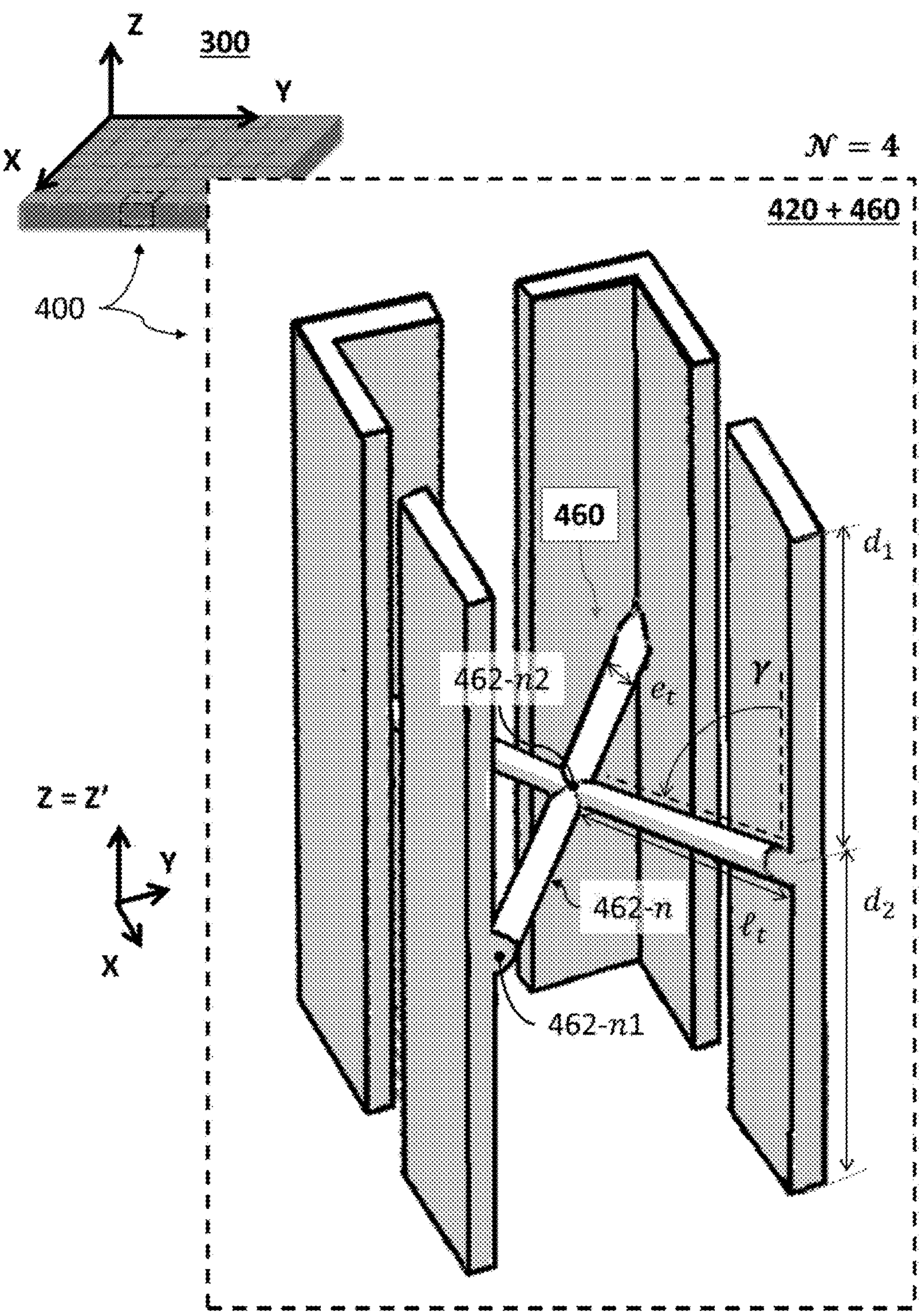
FIG. 3 is a perspective view of a cell of the device for controlling radiofrequency beams, showing the support frame and an internal interconnection of the cell, according to some modes of the invention.

As shown in FIG. 3, an internal interconnection 460 of a cell 400 comprises $\mathcal{N}$ rods 462-*n*.

The $\mathcal{N}$ rods 462-*n* of the internal interconnection 460 have a substantially cylindrical shape, the length $\ell_t$ and a diameter $e_t$. For example and without limitation, the diameters $e_t$ of the rods may be between 400 μm and 540 μm. The $\mathcal{N}$ rods 462-*n* also comprise two ends, denoted 462-*n*1 and 462-*n*2 in FIG. 3. For each of the $\mathcal{N}$ rods 462-*n*, one of the ends 462-*n*1 of the rod 462-*n* is connected to a rim 430-*n* corresponding to a side edge $\mathcal{A}_n$, at an "attachment point", whereas the other end 462-*n*2 of the rod 462-*n* is connected to a "connection point" of the other rods 462-*n*. In particular, the connection point may be positioned substantially in the centre of the cell support frame 420, in the plane (X,Y), such that all of the ends 462-*n*2 of the rods 462-*n* are connected to one another. The $\mathcal{N}$ rods 462-*n* may then have the same length $\ell_t$.

Moreover, the rods 462-*k* may be completely or partly metal so as to form an electrically conductive internal interconnection 460 that interconnects the $\mathcal{N}$ walls 420-*n* so as to join them completely to one another. The internal interconnection 460 then forms an elementary electrical discontinuity that is able to interact with the incident electric fields of the TEM electromagnetic waves produced by the RF sources 100 and/or 200 propagating in the support frame 420. This interaction with the electric fields leads to the formation of electric currents in the rods 462-*k*.

The embodiment of the interconnection 460 in which the attachment points are located at the rims 430-*n* corresponding to the side edges $\mathcal{A}_n$ (as illustrated in FIG. 3) is an interconnection symmetrical with respect to the frame 420. A cell 400 comprising an interconnection 460 symmetrical with respect to the frame 420 is configured to carry out transmission and/or reflection of the TEM electromagnetic waves (produced by the RF sources 100 and 200) that is polarization-invariant. In other words, the frequency response of the cell 400 allows the polarization of the electric fields of the TEM electromagnetic waves incident on a set of cells 400 not to vary after having been transmitted or reflected.

In the embodiments in which the device 300 for controlling RF beams comprises an internal interconnection 460, as illustrated by FIG. 3, the internal interconnection 460 forms a single elementary electrical discontinuity. The device 300 for controlling RF beams is then said to be a "1st-order device".

Furthermore, in embodiments in which $\mathcal{N}$ is equal to 4, as illustrated for example in FIG. 3, an internal interconnection 460 comprises 4 rods able to be connected to the cell support frame 420 at 4 attachment points having (or not having) one and the same distance $d_1$ from the input of the cell 400 (corresponding for example to the face 320). In particular, the distance $d_1$ may be defined on the basis of the length d of the cell support frame 420 (for example $d=d_1\times 2$).

A rod 462-*n* and a rim 430-*n* of a corner element form between them an angle γ at the end 462-*n*1 of the rod 462-*n* (or attachment point). For example, in some embodiments, the rods 462-*n* may be defined in a plane perpendicular to the axis of the prism Z'. Advantageously, the angle γ is then equal to 90° (γ=90°) and the position of the connection point is equal to the position $d_1$ of the attachment points. In other embodiments, each of the $\mathcal{N}$ rods 462-*n* forms an angle γ<90° or γ>90° with the rim 430-*n* of a corner element associated with their attachment point, such that the position of the connection point is above or below the position $d_1$ of the attachment points in the plane perpendicular to the axis of the prism Z'.

The various cells 400 of the device 300 are adjacent and connected to one another by the common cell walls 420-*n*. Moreover, the internal interconnection 460 of each cell 400 is connected to the cell support frame 420 by the various attachment points. Such an arrangement of the cells 400 is carried out such that the cells 400 of the device 300 are joined to one another, despite the presence of the slots 440-*n*.

Figure 4:
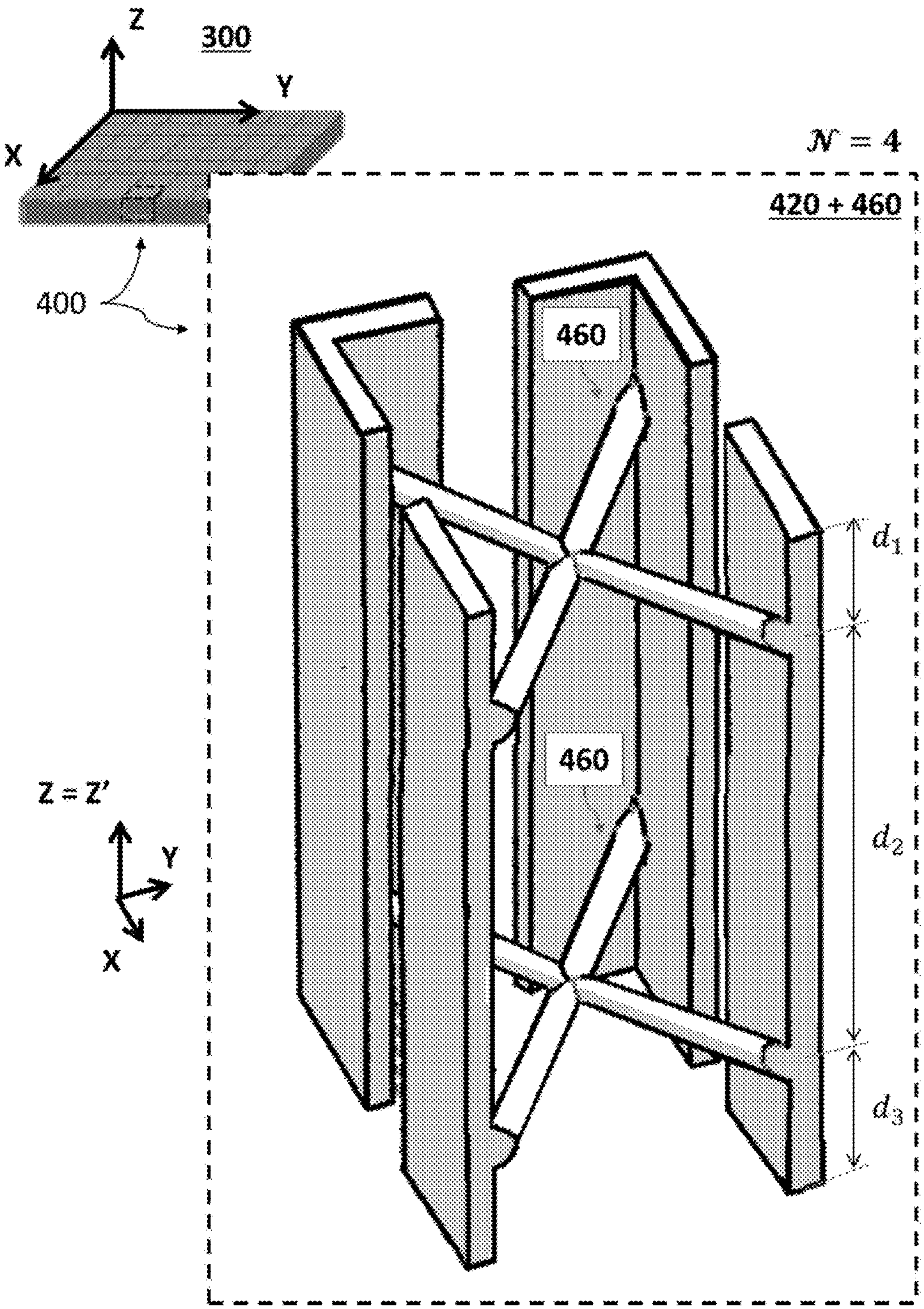
FIG. 4 is a perspective view of a cell of the device for controlling radiofrequency beams, showing the support frame and two interconnections internal to the cell, according to some modes of the invention.

As shown in FIG. 4, a cell 400 may comprise, for example and without limitation, two internal interconnections 460, as described with reference to the embodiment of FIG. 3. Each of these two internal interconnections 460 comprises $\mathcal{N}$ rods 462-*n*. In the embodiments in which the device 300 for controlling RF beams comprises two internal interconnections 460, forming two elementary electrical discontinuities, the device 300 for controlling RF beams is said to be a "2nd-order device".

A first internal interconnection 460 may be connected to the cell support frame 420 at $\mathcal{N}$ attachment points located at one and the same distance $d_1$ from the input of the cell 400 (corresponding for example to the face 320), while a second internal interconnection 460 may be connected to the cell support frame 420 at $\mathcal{N}$ attachment points located at one and the same distance $d_3$ from the output of the cell 400 (corresponding for example to the face 310). The distance $d_2$ between the n respective attachment points of the two internal interconnections 460 is defined based on the length d of the cell support frame 420 (for example $d=d_1+d_2+d_3$).

Advantageously, the choice of the joining positions of the rods 462-*n* determines the dimensions $d_1$ and $d_3$ of cells and makes it possible to influence the expansion of the frequency band of the beam (in particular in transmission mode). Furthermore, the various dimensions $d_1$ and $d_3$ of the set of cells 400 of the device 300 for controlling RF beams may be identical or variable depending on the application of the invention. For example, and without limitation, a device 300 for controlling RF beams used to transmit and/or deflect and/or reflect an RF beam may comprise dimensions $d_1$ and $d_3$ that are variable with respect to the centre O of the device in order to spatially modulate the phase of the incident beam.

The device 300 for controlling RF beams according to the invention may be manufactured based on a model of the cells 400 in the form of an equivalent circuit diagram (design phase). Such a model advantageously makes it possible to optimize the quasi-optical control properties of the RF beams that are desired for the device 300 depending on the application of the invention. In particular, the characteristics of the cell support frame 420 consisting of $\mathcal{N}$ corner elements 4200-*n*, forming $\mathcal{N}$ walls 420-*n* each interrupted by one of the $\mathcal{N}$ slots 440-*n*, make it possible to model a characteristic impedance $\mathcal{Z}_1$ of a cell 400. Advantageously, the characteristic impedance $\mathcal{Z}_1$ of a cell 400 is determined on the basis of the parameters d and $\mathcal{w}$ of the cell 400. For example, a smaller slot width $\mathcal{w}$ may lead to a greater characteristic impedance $\mathcal{Z}_1$. In this case, the variation in the profile of the slots (using notches) may be implemented in the design phase so as to optimize the characteristic impedance $\mathcal{Z}_1$.

An internal interconnection 460 of a cell (the interconnection 460 comprising $\mathcal{N}$ rods 462-*n*), which is electrically conductive, forms an electrical discontinuity in the cell 400. Furthermore, two internal interconnections 460 form a number of 2 successive electrical discontinuities in the cell 400, corresponding to the two sets of $\mathcal{N}$ rods 462-*n*. Thus, in the embodiments of cell 400 shown in FIGS. 3 and 4, the electrically conductive rods 462-*n*, also called "inductive rods", form a sequence of inductive loads denoted "L", and expressed in nH (nanohenries), and positioned in parallel in the equivalent circuit of the cell 400.

Figure 5:
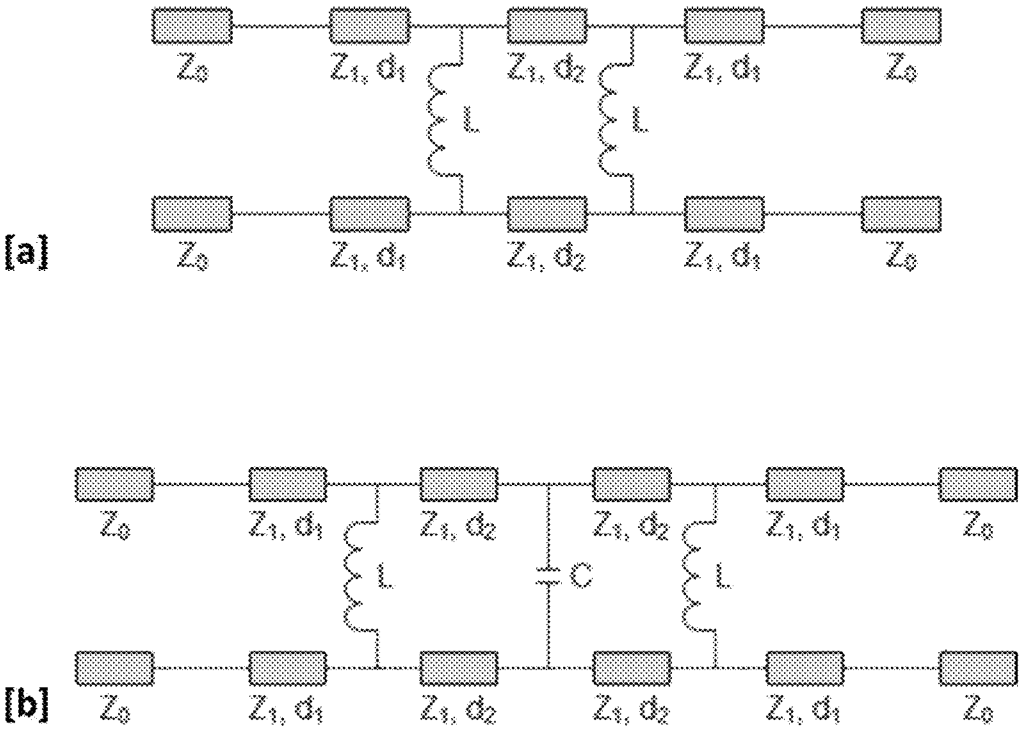
FIG. 5 shows an equivalent circuit modelled based on cells of the device for controlling RF beams, according to two diagrams (a) and (b), in some modes of the invention.

Diagram (a) of FIG. 5 shows such an equivalent circuit modelled based on cells of the device for controlling RF beams.

The parameters relating to the electrical representation of the cell 400 in the form of an equivalent circuit depend on the position of the joining points 462-*n*1 of the rods 462-*n* along the dimensions $d_1$ and $d_3$.

Thus, with reference to the example of FIG. 4 and the circuit modelled in diagram (a) of FIG. 5, the first inductive load and the second inductive load are connected respectively at input and at output of the line portion of characteristic impedance $\mathcal{Z}_1$ of length respectively $d_1$ and $d_3$ (with for example $d_3=d_1$).

Advantageously, the configuration of the internal interconnections 460 symmetrically with respect to the cell support frame 420, using attachment points at the rims 430-*n*, makes it possible to model equivalent electromagnetic circuits of the cell 400 that are identical (or invariant) with respect to the characterization according to each polarization, TE and TM, of the incident electric fields of the TEM waves produced by the RF sources 100 and 200.

The inductances L of the successive inductive loads modelled by the equivalent circuit may furthermore depend on the one or more diameters $e_t$ of the $\mathcal{Z}$ rods 462-*n* of the internal interconnections 460. In particular, the increase in the diameter $e_t$ may lead to a decrease in the inductance. In some embodiments of the invention, an increase in the diameter $e_t$ by three may lead to a decrease in the inductance L by a factor of three. By way of non-limiting example, an excessively large diameter $e_t$ might significantly degrade the width of the transmission band for high frequencies (from the source 200). In this case, a step of optimizing the one or more diameters $e_t$ may be implemented in the design phase of the device 300 in order to optimize the one or more inductance L values in parallel. For example, it is possible to obtain inductances L up to a limit value $L_{limit}$ determined based on a minimum value of the diameter $e_t$ of the rods.

The inductances L may also depend on the angle of incline γ of the $\mathcal{N}$ rods 462-*n*. In particular, a large variation in this angle of incline γ with respect to a value of 90° may lead to an increase in the inductance, on the one hand, while the distribution of the positions of this inductance is asymmetric on the equivalent circuit. This may result in effects on the reflection and transmission properties of the device 300. For example, the variation in the angle γ may be linked to the expansion of the operating band of the device 300, with simultaneous degradation of the reflection level.

Figure 6:
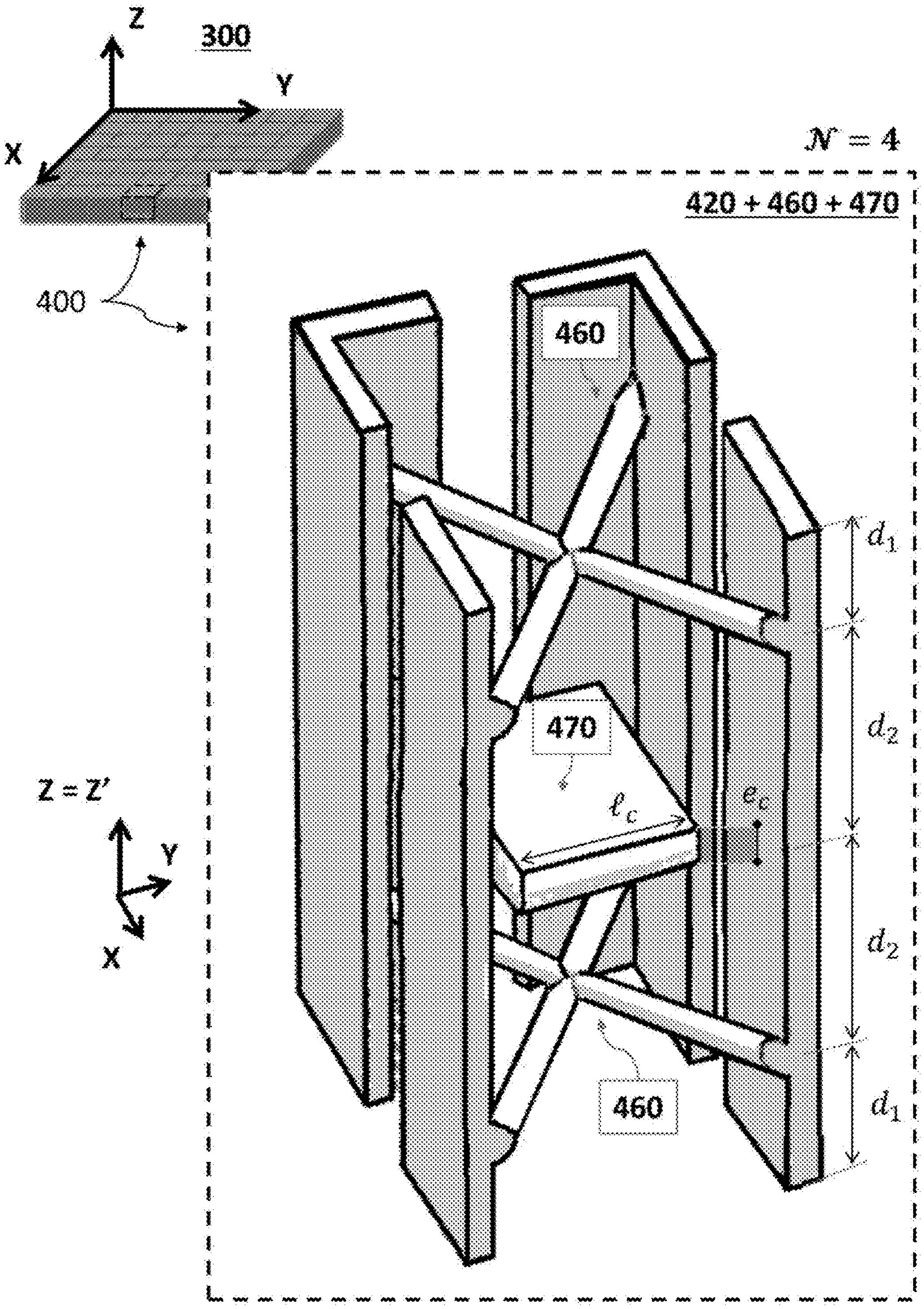
FIG. 6 is a perspective view of a cell of the device for controlling RF beams, showing the support frame, two internal interconnections and a plate internal to the cell, according to some modes of the invention.

FIG. 6 shows a perspective view of a cell 400 comprising two internal interconnections 460 and a plate 470 internal to the cell support frame 420, according to some modes of the invention in which the number $\mathcal{N}$ is equal to 4.

The plate 470 internal to the cell support frame 420 may extend in a plane orthogonal to the axis of the prism Z' and be arranged (or positioned) substantially in the middle of the two internal interconnections 460.

An internal plate 470 may have a metal structure having a thickness $e_c$ and a shape adapted to the shape of the polygonal base of $\mathcal{N}$ sides of the support frame 420. For example and without limitation, the polygonal base of the cell support frame 420 may have a square shape ($\mathcal{N}$=4) with sides of length $\ell$ and the internal plate 470 may have a square shape with sides of length $\ell_c$, such that $\ell_c = \ell - \varepsilon$ and $\varepsilon \ll \ell$.

In particular, the internal plate 470 may be designed to approach the cell support frame 420, with a spacing (or length) $\varepsilon \neq 0$, but not be metallically connected, by the sides of the internal plate 470, to the cell support frame 420. In some embodiments, the internal plate 470 may be held inside the cell support frame 420 by a dielectric support means. As an alternative, the internal plate 470 may be held by a dielectric or metal connection to the two internal interconnections 460. For example, this dielectric or metal connection to the two internal interconnections may be a central pillar extending along the axis of the prism Z' and comprising an upper end and a lower end that are connected to the two internal interconnections 460, the capacitive plate then being arranged substantially in the middle of the central pillar between the two internal interconnections 460.

A metal and electrically conductive internal plate 470 may lead to a capacitive charge denoted "C" expressed in fF (femtofarads), forming an elementary electrical discontinuity in the cell 400. Such a plate 470 internal to the cell support frame 420 corresponds more generally to a plate called "capacitive plate".

According to the embodiments in which the device 300 for controlling RF beams comprises two internal interconnections 460 (inductive rods) and an internal plate 470 (capacitive plate), forming three elementary electrical discontinuities as described with reference to the example in FIG. 6, the device 300 for controlling RF beams is then said to be a "3rd-order device".

The equivalent circuit diagram model of the cell 400 as shown in FIG. 6 is shown in diagram (b) of FIG. 5. This equivalent circuit diagram model shows a sequence of loads: inductive (L), capacitive (C) and inductive (L). Each of the loads (capacitive and inductive) in the modelled equivalent circuit is designed to implement a frequency response of the device 300 for controlling RF beams of high-pass filter type. Such a structure of the cells 400 notably makes it possible to obtain a significant increase in the rejection of the low frequency band. For example, at 8.5 GHz, the rejection of the X band may reach 32 dB when the passband is the Ka band.

The capacitance C of the capacitive load, modelled for example in the equivalent circuit in FIG. 5 (*b*), may therefore depend on the various dimensions of the capacitive plate. In particular, the increase in the thickness $e_c$ may increase the capacitance of the circuit. In some embodiments of the invention, an increase in the diameter $e_c$ may involve an increase in the capacitance C. By way of example, an excessively large diameter $e_c$ might significantly degrade the width of the transmission band for high frequencies (from the source 200).

The capacitive plate may have any shape adapted with respect to the shape of the polygonal base of the cell support frame 420.

In some embodiments, to achieve the same performance as for a capacitive plate having a shape equivalent to the shape of the polygonal base, the cell 400 may comprise a cell support frame 420 having a wall 420-*n* thickness $m_c$ that is greater locally in the plane of the capacitive plate compared to the wall 420-*n* thickness m. A local thickening of the walls of the frame 420 up to a spacing ε of the shape of the capacitive plate makes it possible to obtain performance similar to the above case, in which there is no local thickening of the walls 420-*n*. Advantageously, this alternative may be used if large values of C are to be implemented.

Advantageously, depending on the envisaged application of the invention, the design of the device 300 for controlling RF beams may comprise a step of determining the order x of the device in order to optimize the parameterization associated with the control of RF beams (for example the expansion of the frequency band of the beam coming from the first RF source 100 to be reflected and/or of the beam coming from the second RF source 200 to be transmitted). In particular, during the modelling of the cells 400 in the form of an equivalent circuit, determining the order x of the device may comprise evaluating the sequences of inductive loads or the sequences of inductive and capacitive loads, as shown in the table of FIG. 7.

The device 300 for controlling RF beams may be manufactured using various techniques, such as a 3D printing technique, also called additive manufacturing. Advantageously, the use of a 3D printing technique makes it possible to obtain a uniform device 300 for controlling RF beams, not comprising any dielectric and completely metal, using an electrically conductive material such as aluminium or titanium, for example. The electrically conductive material such as titanium may then be coated with another electrically conductive material such as silver for example in order to reduce ohmic losses. In addition, the 3D manufacturing technique leads to generated passive intermodulation products (or PIP) of lower intensity, such that the device 300 for controlling RF beams is able to withstand higher powers coming from the RF signal sources.

In some modes of the invention, depending on the manufacturing technique used to manufacture the device 300 for controlling RF beams, some additional internal elements may be added to the cell support frame 420, such as a central pillar for example.

Figure 8:
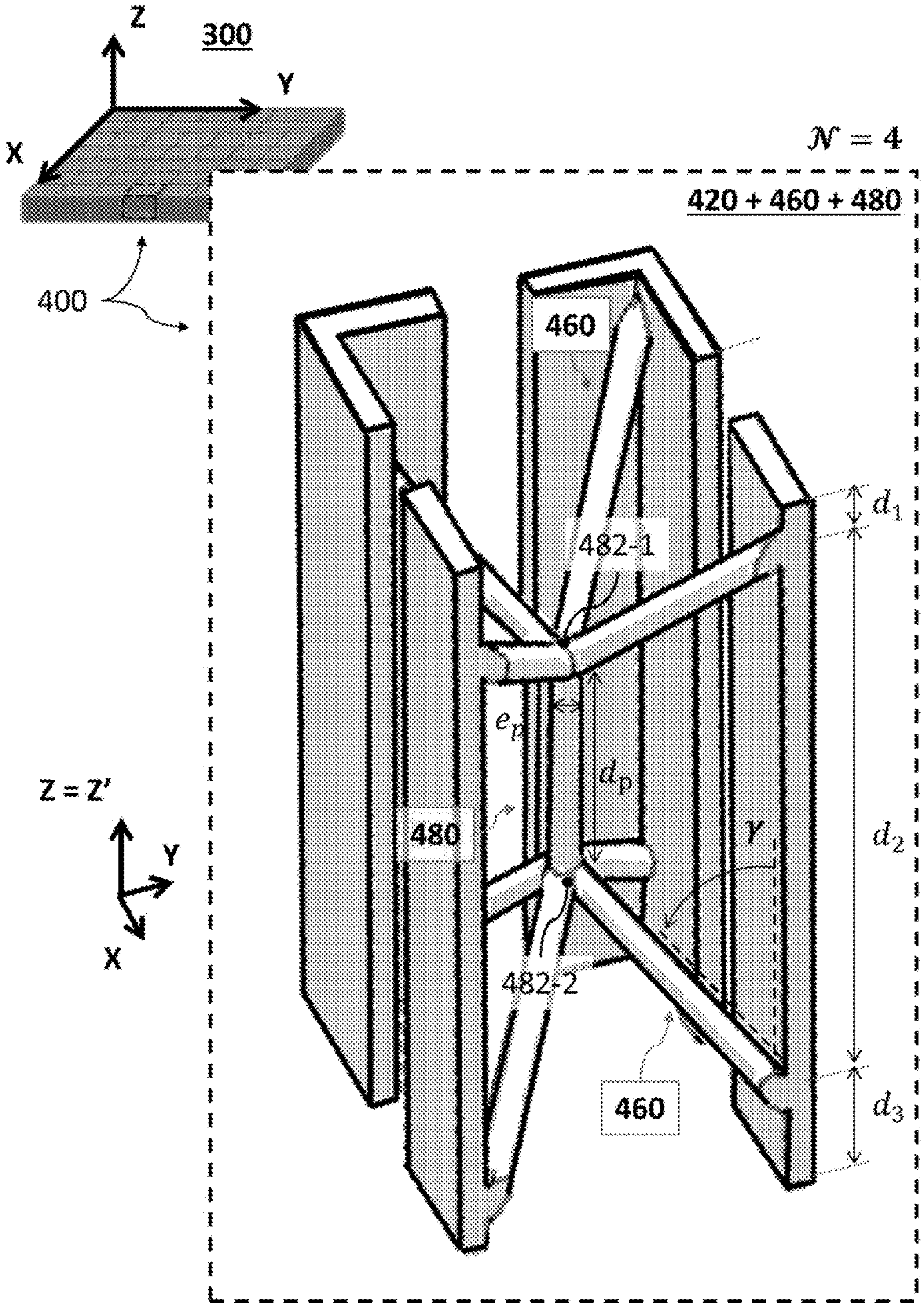
FIG. 8 is a perspective view of a cell of the device for controlling radiofrequency beams, showing the support frame, two internal interconnections and a pillar central to the cell, according to some modes of the invention.

FIG. 8 shows a perspective view of a cell 400 comprising two internal interconnections 460 and a central pillar 480 arranged in the centre of the cell support frame 420, according to one exemplary embodiment of the invention in which the number $\mathcal{N}$ is equal to 4.

Although it is not limited to such embodiments, the use of a central pillar 480 is particularly advantageous in embodiments in which the manufacturing technique is a 3D printing technique.

The central pillar 480 may have a substantially cylindrical shape, with a diameter denoted $e_p$ and a length $d_p$, and comprise two ends denoted 482-1 and 482-2 and called "upper end 482-1" and "lower end 482-2". The central pillar 480 extends along the axis of the prism Z' (in the direction of its length) and is thus parallel to the general orientation of the $\mathcal{N}$ walls 420-*n*. The central pillar 480 is furthermore arranged (or positioned) substantially in the centre of the cell support frame 420 (that is to say centre of the frame in the plane orthogonal to the axis of the prism Z'). At least one of the two ends 482-1 and 482-2 may be positioned outside the cell 400. If both ends 482-1 and 482-2 are positioned outside the cell 400, the relationship $d_z \leq d$ is satisfied. If just one of the two ends 482-1 or 482-2 is positioned outside the cell 400, the relationship $d_z \leq d$ or $d_z > d$ may be satisfied. As an alternative, the two ends 482-1 and 482-2 of the interconnection 480 may be positioned inside the cell 400, such that $d_z \leq d$.

Moreover, as shown in FIG. 8, each of the two ends 482-1 or 482-2 of the central pillar 480 is connected to one of the two connection points formed by the ends 462-*n*2 of the rods 462-*n* of each of the two internal interconnections 460. For example, the upper end 482-1 may be connected to the rod connection point of one of said internal interconnections 460, and the lower end 482-2 may be connected to the rod connection point of another internal interconnection 460. The two internal interconnections 460 and the central pillar 480 thus form a single interconnection of the cell support frame 420.

This single integral interconnection allows high mechanical rigidity of the rods 462-*n*, and more generally of the cells 400. Such rigidity leads notably to mechanical stability of the device 300 over time, and thus to these quasi-optical control properties of RF beams, in applications of the invention using very high-power sources. Moreover, the central pillar 480 facilitates the manufacture of the internal interconnections 460 and therefore of the cells 400 with slotted faces, in particular when the device 300 for controlling RF beams is manufactured using a 3D printing technique.

According to some embodiments, the distance $d_2$ between the two sets of attachment points of the rods 462-*n* formed by the two internal interconnections 460 may be greater than, less than or equal to the length $d_p$ of the central pillar 480. In particular, the distance $d_p$ may depend on the angle γ. For example, in some embodiments, the two sets of rods 462-*n* may be defined in a plane perpendicular to the axis of the prism Z', as illustrated by the example of internal interconnections 460 in FIG. 4. The angle γ is then equal to 90° (γ=90°) and the distance $d_2$ is equal to $d_p$. In other embodiments, each of the rods 462-*n* forms an angle γ<90° or an angle γ>90° with the rim 430-*n* of a corner element associated with their attachment point (which coincides with a side edge $\mathcal{A}_n$). For example, the angle γ may be equal to an angle of 90°±45° (γ=45° et/ou 135°), in embodiments using a 3D printing technique, and the distance $d_2$ may be greater than $d_p$, as illustrated in FIG. 8. A person skilled in the art will easily understand that these exemplary angles γ and distances $d_2$ are given by way of non-limiting example and that the invention covers any combination of angles γ and distances $d_2$ that may be implemented depending on the properties desired for the device 300, such as for example the properties of quasi-optical control of RF beams, stability and rigidity, ease of manufacture, etc. The single interconnection 460 interconnecting the $\mathcal{N}$ walls 420-*n* so as to join them makes it possible to obtain a structure of the device 300 for controlling RF beams having very good solidity properties, by way notably of the central pillar 480, the attachment points at the rims 430-*n*, and the angle γ of the rods 462-*n*.

In one non-limiting exemplary embodiment, the diameter $e_p$ of the central pillar 480 may be equal to 400 μm. The central pillar 462 has substantially no effect on the quasi-optical RF beam control properties of the device 300. Indeed, the propagation is orthogonal to the pillar for the incident electric fields of the TEM electromagnetic waves (produced by the RF sources 200 for example) that propagate in the waveguide formed by the cell support frame 420. This orthogonal propagation does not lead to any formation of electric current in the central pillar 480, the diameter $e_p$ being negligible compared to the RF frequency bands. The impact of the central pillar 480 in the equivalent circuit model is therefore substantially negligible. For example, the single interconnection in FIG. 8 may be substantially modelled by the two internal interconnections 460 shown in FIG. 4, that is to say a sequence of two inductive loads (L). Diagram (a) of FIG. 5 therefore shows the equivalent circuit modelled based on such cells of the device 300 for controlling RF beams.

Since the impact of the central pillar 480 is negligible in the equivalent circuit model, a person skilled in the art will easily understand that such a specific interconnection configuration, comprising one or more central pillars 480, may be adapted to any x-order device designs, such that x≥2, depending on the determination of the number and the nature of the sequences of loads (inductive, or inductive and capacitive) shown as an example in FIG. 7.

Advantageously, depending on the manufacturing technique of the device 300 for controlling RF beams, the addition of one or more central pillars 480 makes it possible to facilitate the manufacture of one or more plates 470 internal to the cell support frame 420. In particular, a capacitive plate may be formed by a local expansion of the diameter $e_p$ over a small portion $e_c$ of the length $d_p$ of a central pillar 480 of a single interconnection. The local expansion of the diameter $e_p$ may furthermore have a shape equivalent to the shape of the polygonal base with a side length $\ell_c$.

Figure 9:
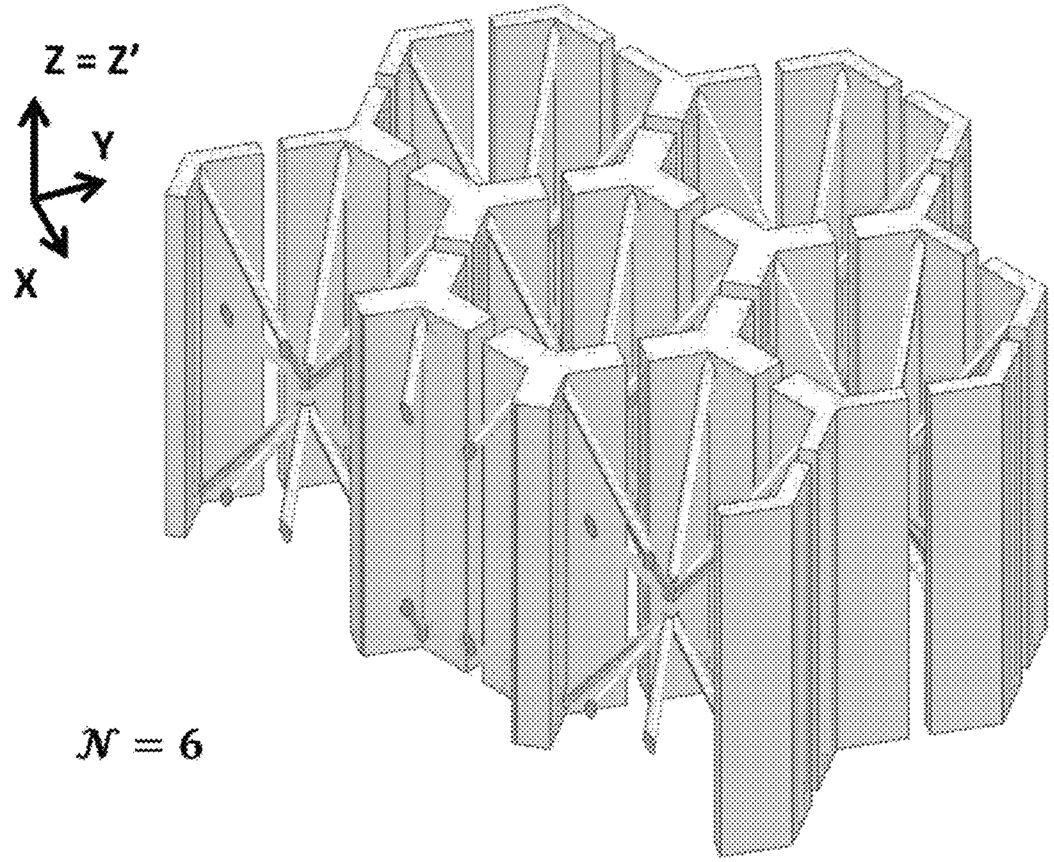
FIG. 9 is a perspective view of a set of cells of the device for controlling RF beams, according to some modes of the invention.

FIG. 9 shows a perspective view of multiple cells 400 of the device 300 for controlling RF beams, in an embodiment in which the number $\mathcal{N}$ is equal to 6.

In such an embodiment in which the number $\mathcal{N}$ is equal to 6, the device 300 for controlling RF beams has hexagonal waveguide sections in transmission mode.

Advantageously, if the number $\mathcal{N}$ increases, the device 300 for controlling RF beams may have better polarization-invariance and transmission stability properties compared to the variation in the aperture angle of the incident injected electromagnetic wave. Such an increase leads to greater solidity of the structure.

As an alternative, if the number $\mathcal{N}$ decreases, the device 300 for controlling RF beams may exhibit manufacturing advantages since the structure contains less material.

In the embodiments of the cell support frame 420 shown in FIGS. 2 to 5, 8 and 9, the axis of the prism Z' is parallel to the axis Z. The axis of the prism Z' may furthermore have an incline β with respect to the axis Z.

Figure 10:
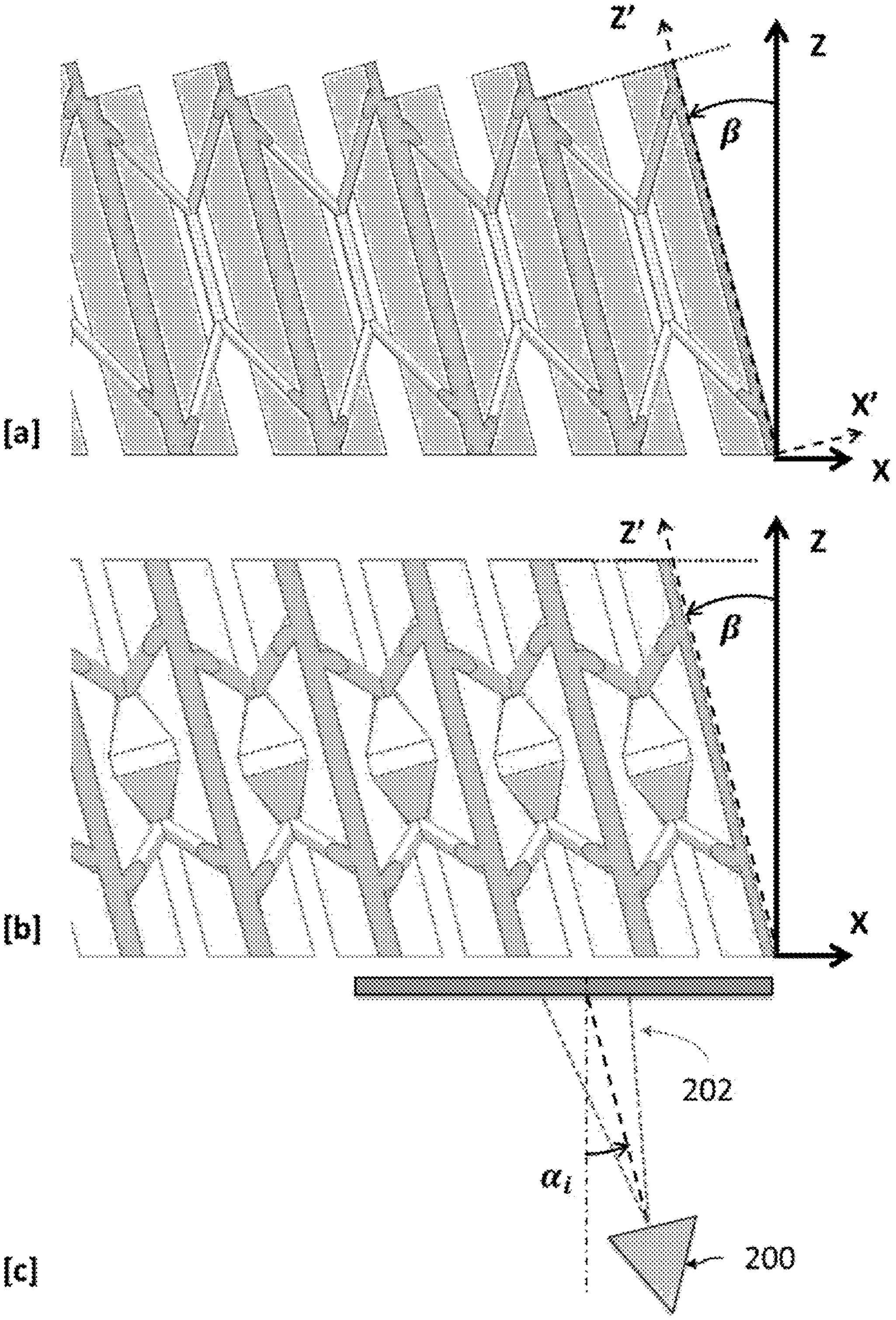
FIG. 10 is a sectional view (X,Z) of a set of cells of the device for controlling RF beams shown by diagrams (a) and (b), and of an optical system shown by diagram (c), according to some exemplary applications of the invention.

FIG. 10 shows views in a plane (X,Z) of multiple cells 400 of the device 300 for controlling RF beams according to two modes of the invention shown in diagrams (a) and (b), in which the walls 420-*n*, the slots 440-*n* (and also the central pillars 480) of the cell support frame 420 are oriented with an incline β with respect to the axis Z.

In some embodiments of the optical system 10 in FIG. 1, the angle of incline β of the cells 400 is for example between 0° and $\alpha_i$ with respect to the axis Z. Indeed, the axis of the prism Z' of the cells 400 of the device 300 for controlling RF beams, which is inclined with respect to the average direction of incidence of the beam at the spherical wavefront of two RF sources 100, 200, at an angle of incidence denoted $\alpha_i$, may be formed of cells 400 with an angle of incline $\beta=\alpha_i$ as illustrated schematically in diagrams (a), (b) and (c) of FIG. 10, so as to increase the robustness of the quasi-optical properties of the structure with respect to the angular sector, that is to say the angle of incidence and the aperture angle θ of the beams.

In particular, such a concept of inclining the cells 400 makes it possible to double this angular sector (±10° about $\alpha_i$=30°) in comparison with the solutions from the prior art.

It should be noted that this incline β of the cells 400 has no significant influence on the equivalent circuit diagram model. However, this incline may lead to an increase in the thickness of the walls 420-*n*.

Diagram (a) of FIG. 10 shows a single interconnection (comprising two internal interconnections 460 and a central pillar 480) defining a sequence of two inductive loads. In this diagram, the input face 310 is in the plane (X,Y), while the output face 320 comprises a bevelled (or stepped) structure perpendicular to the axis of the prism Z' defining the incline of the cell support frames 420.

The geometry of the input face 310 and output face 320 could lead to an asymmetry that could deteriorate the balancing of the phases of the beams to be controlled. Such an imbalance may be avoided or compensated for by variations in width $w$ of the slots 440-*n*, leading to a shift in the impedance bandwidth for the incidence of the TE and TM polarizations (the relative width difference may therefore not be significant).

Advantageously, the input face 310 and output face 320 may each comprise a bevelled (or stepped) structure perpendicular to the axis of the prism Z' defining the incline of the cell support frames 420. This face configuration may for example give the device 300 better theoretical RF beam transmission performance.

Diagram (b) of FIG. 10 corresponds to a single interconnection (comprising two internal interconnections 460 and a central pillar 480 expanded at the centre in order to form an internal plate 470) defining a sequence of loads: inductive, capacitive and inductive. In this diagram, the input face 310 and output face 320 are parallel to one another and to the plane (X,Y).

A person skilled in the art will easily understand that the input face 310 and output face 320 of the devices 300, shown in diagrams (a) and (b) of FIG. 10, are non-limiting examples and that the input face 310 and/or output face 320 of the devices 300 may, as a variant, comprise a stepped structure, and/or that the input face 310 and/or output face 320 of the devices 300 may be parallel to the plane (X,Y). In particular, the spectral response of a device 300 comprising at least one face comprising a stepped structure may be optimum in relation to the embodiments of the optical system 10 of FIG. 1. Indeed, such stepped structures are suitable for oblique incident waves, allowing discontinuity-free propagation in the waveguides formed by the cell support frames 420.

However, such stepped structures may lead to variations in wall thickness m, as illustrated in diagram (a) of FIG. 10. A minimum wall thickness $m_{min}$ may thus be defined depending on the manufacturing process (for example $m_{min}$=250 m), thereby potentially making it possible to double the wall thickness m=500 μm within a cell 400. This variation in wall thickness between $m_{min}$ and m may be incremental or gradual. It should be noted that this doubling of wall thickness may lead to modifications in the quasi-optical operating properties of the device 300. Such modifications may be compensated for by variations (in particular an increase) in the width $w$ of the slots 440-*n*.

The equivalent circuit model of the devices, shown in diagrams (a) and (b) of FIG. 10, may take into account the incline β in the variation in the characteristic impedance $\mathcal{Z}_1$ of the waveguides. The characteristic impedance $\mathcal{Z}_1$ may notably remain substantially stable for small inclines β, for example for values of β less than or equal to 30° (β≤30°). Conversely, the characteristic impedance $\mathcal{Z}_1$ may be modified significantly for large inclines β, for example for values of β strictly greater than 30° (β>30°).

Advantageously, the implementation of the incline β of the cells 400 and the modularity of the structures (stepped structure or structure parallel to the faces) of the input face 310 and/or output face 320 of the devices 300 may be facilitated by the use of 3D printing techniques. In particular, the device 300 for controlling RF beams produced by 3D printing has a good surface condition. The inclination of the cells 400 and the use of additive manufacturing thus furthermore makes it possible to halve the insertion losses of the beams from the RF source 200 to be transmitted compared to the reference from the prior art.

It should be noted that diagram (b) of FIG. 10 illustrates cells 400 comprising an internal plate 470 corresponding to a local expansion of the diameter $e_p$, over a portion $e_c$ of the length $d_p$ of a central pillar 480. In this diagram, the internal plates 470 incorporate certain additive manufacturing constraints. The internal plates 470 and the central pillar 462 then form a structure comprising two pyramidal shapes (with a slope of 45° for example) that do not modify the performance of the interconnection 460.

Figure 11:
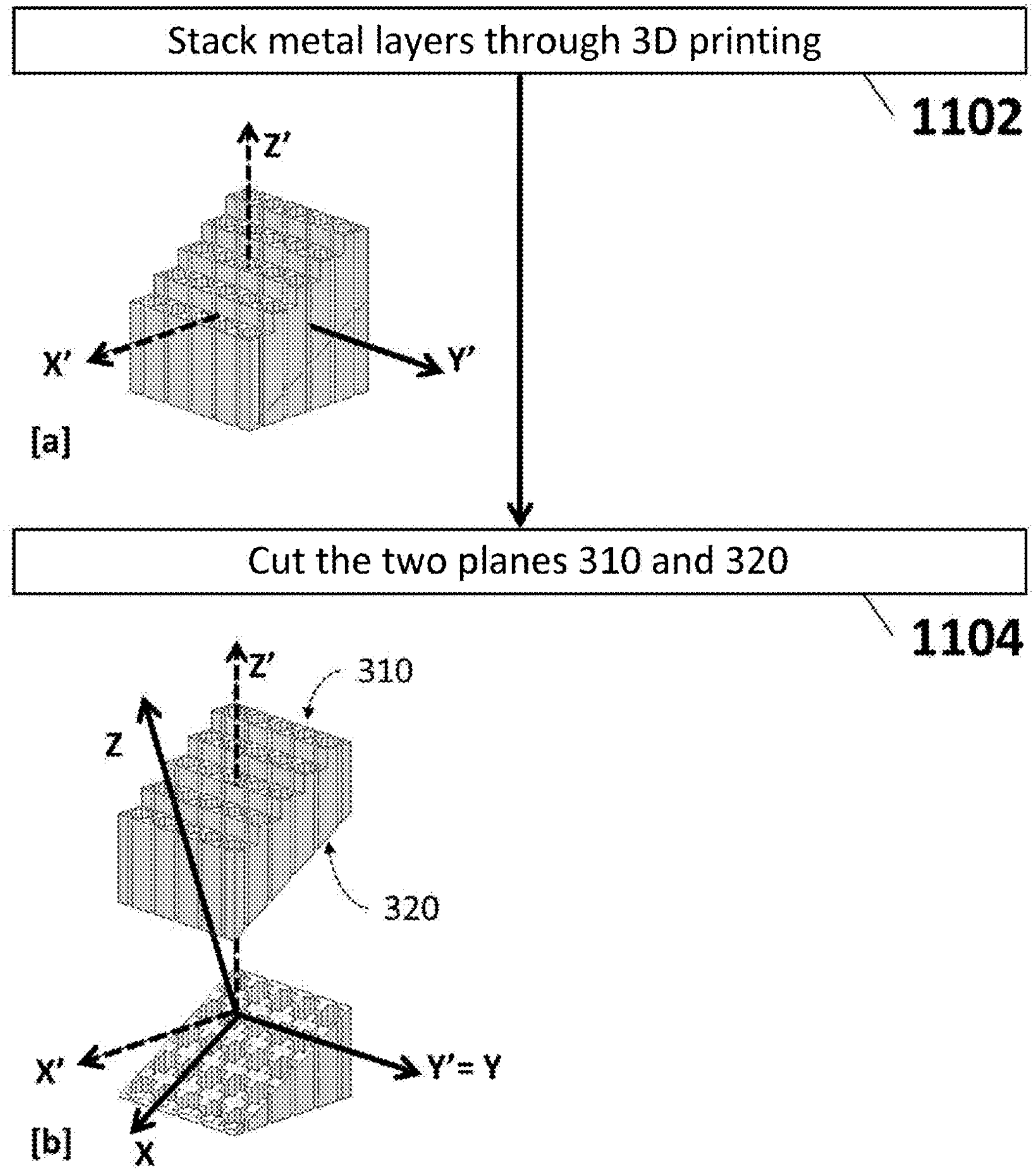
FIG. 11 shows steps of the method for manufacturing the device for controlling RF beams, according to some embodiments of the invention.

FIG. 11 is a flowchart showing two steps of a manufacturing method according to some embodiments of the device 300 for controlling RF beams in which the cells 400 have an angle of incline β. FIG. 11 also shows a perspective view of a set of cells of the device 300 for controlling RF beams, illustrated by diagrams (a) and (b), in two steps of the manufacturing method.

In step 1102, a material is deposited primarily by additive manufacture, along the axis of the prism Z' having an angle of incline β with the axis Z, so as to form stacked metal layers.

In step 1104, the structure formed by the stacked metal layers is cut at the input face 310 of the device 300 for controlling RF beams. For example, the face 310 may be defined by a plane parallel to the plane (X,Y) of the device 300 for controlling RF beams.

As illustrated by diagram (a) of FIG. 10, this method may lead to an asymmetric discontinuity that leads to slight interference in the frequency response of the device 300 for controlling RF beams. However, this interference may be compensated for by reducing the incline of the cells 400 with respect to the average direction of incidence (typically $\beta=20° < \alpha_i=30°$).

Figure 12:
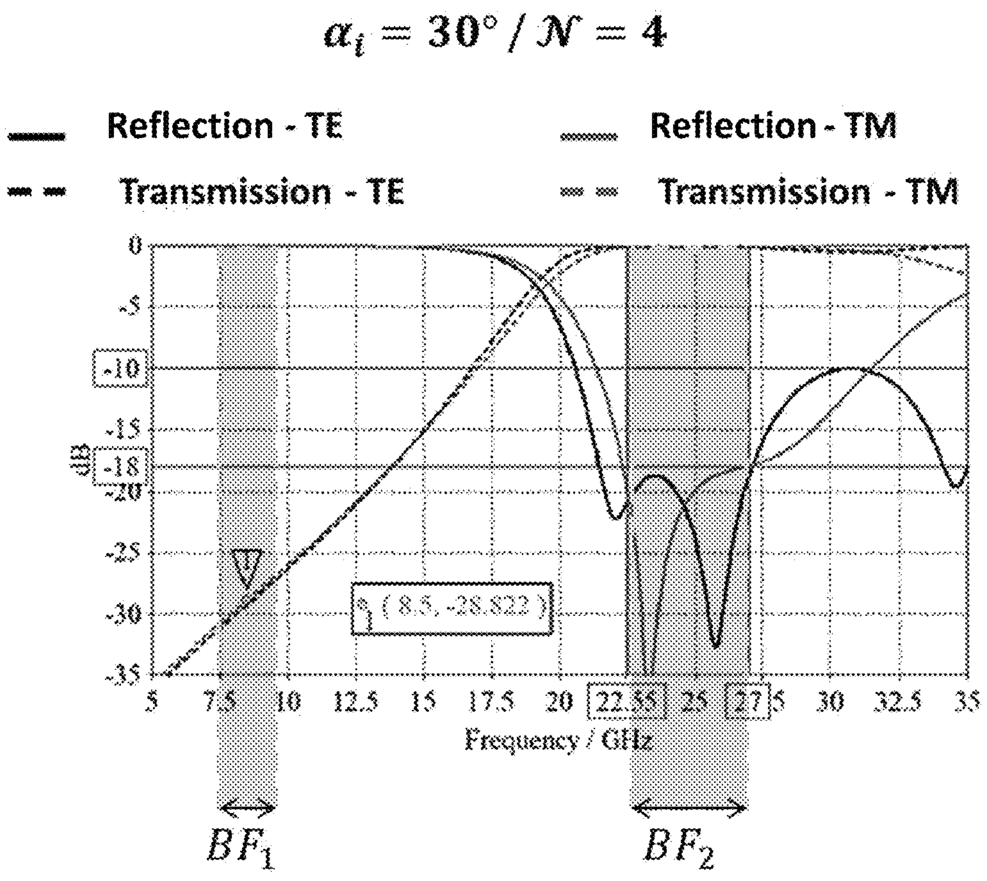
FIG. 12 is a graph illustrating the radio performance achieved by a device 300 for controlling RF beams, according to some exemplary embodiments of the invention.

FIG. 12 is a graph showing one example of radio performance achieved by the device 300 for controlling RF beams used as a dichroic screen.

The graph of FIG. 12 shows the evolution of the transmission gain and of the return losses in reflection mode as a function of frequency, with two polarisations, TE and TM. The graph highlights notably a wide Ka and X frequency band of the incident electromagnetic wave, which is polarization-invariant.

The invention is not limited to the embodiments described above by way of non-limiting example. It encompasses all variant embodiments that might be envisaged by a person skilled in the art. In particular, a person skilled in the art will understand that the invention is not limited to the cell geometries, frame geometries and interconnection geometries described by way of non-limiting example.

The invention claimed is:

1. A device for controlling radiofrequency beams, comprising a set of at least one cell, said cell comprising a support frame and at least one interconnection internal to said support frame, said radiofrequency beams being TEM electromagnetic waves having a given polarization, wherein said support frame is inscribed within a general shape of a prism, having a given axis Z', said prism comprising N faces $P_n$ connected to one another by N edges $A_n$, oriented along the axis of the prism Z', said support frame comprising N corner elements, each corner element having a rim coincident with one of said edges of the prism, the corner elements being arranged such that the support frame has, on each face of the prism, a slot extending along the axis of the prism Z', said support frame being interrupted by said slots; and in that each internal interconnection comprises N inductive rods each comprising two ends, the inductive rods each having a first end connected to one of said rims of the support frame, the second ends of the inductive rods being connected to one another at a rod connection point, said rod connection point being positioned substantially in the centre of said support frame in a plane orthogonal to the axis of the prism Z', each cell being configured to carry out polarization-invariant transmission and/or reflection of radiofrequency beams of said TEM electromagnetic waves.

2. The device for controlling radiofrequency beams according to claim 1, wherein the cell comprises at least two internal interconnections, and wherein the cell furthermore comprises at least one capacitive plate internal to said support frame and extending in a plane orthogonal to the axis of the prism Z', said at least one capacitive plate being arranged between said two internal interconnections.

3. The device for controlling radiofrequency beams according to claim 1, wherein a cell comprises at least two internal interconnections, and wherein the cell furthermore comprises at least one central pillar extending along the axis of the prism Z' and being arranged substantially in the centre of said support frame, said central pillar comprising an upper end connected to the rod connection point of one of said internal interconnections, and a lower end connected to the rod connection point of another internal interconnection.

4. The device for controlling radiofrequency beams according to claim 2, wherein said at least one capacitive plate is connected to the support frame by at least one central pillar extending along the axis of the prism Z' and comprising an upper end and a lower end, the capacitive plate being arranged substantially in the middle of the central pillar.

5. The device for controlling radiofrequency beams according to claim 2, wherein said at least one capacitive plate is held inside the support frame by way of a dielectric support.

6. The device for controlling radiofrequency beams according to claim 1, wherein said support frame and said at least one internal interconnection, forming each cell, are electrically conductive and consist of a single electrically conductive material.

7. The device for controlling radiofrequency beams according to claim 1, wherein the number Nis equal to 4 and said support frame having a square parallelepipedal shape, or wherein the number Nis equal to 6 and said support frame having a hexagonal prism shape.

8. The device for controlling radiofrequency beams according to claim 1, wherein the device for controlling radiofrequency beams is defined in a coordinate system (X,Y,Z), the device for controlling radiofrequency beams generally extending in a plane (X,Y), and wherein the axis of the prism Z' is parallel to said axis Z, said support frame having a right prism shape.

9. The device for controlling radiofrequency beams according to claim 1, wherein the device for controlling radiofrequency beams is defined in a coordinate system (X,Y,Z), the device for controlling radiofrequency beams generally extending in a plane (X,Y), the axis of the prism Z' having an incline $\beta$ with respect to the axis Z, and said support frame having an oblique prism shape.

10. The device for controlling radiofrequency beams according to claim 1, wherein the inductive rods and the rims of said support frame form an angle $\gamma$ between 45° and 90°, and/or between 90° and 135°.

11. The device for controlling radiofrequency beams according to claim 1, wherein the device for controlling radiofrequency beams is defined in a coordinate system (X,Y,Z), the device for controlling radiofrequency beams generally extending in a plane (X,Y), the device comprising a set of multiple cells having variable geometric shapes and dimensions in the plane (X,Y).

12. An optical system comprising at least one first radiofrequency signal source configured to emit a radiofrequency beam of frequency band $\lambda_1$ in a given propagation direction and a device for controlling radiofrequency beams according to claim 1, said device for controlling radiofrequency beams being configured to reflect and/or transmit the radiofrequency beam in said given propagation direction and said frequency band $\lambda_1$.

13. The optical system according to claim 12, wherein the optical system comprises at least two radiofrequency signal sources, said sources comprising a second source configured to emit a radiofrequency beam of frequency band $\lambda_2$ in a given propagation direction, and wherein the device for controlling radiofrequency beams is defined in a coordinate system (X,Y,Z), the device for controlling radiofrequency beams generally extending in a plane (X,Y), the device for controlling radiofrequency beams being configured to reflect radiofrequency signals of frequency band $\lambda_1$ and transmit radiofrequency signals of frequency band $\lambda_2$, said device for controlling radiofrequency beams being positioned between said sources, the axis Z having an angle of incidence $\alpha_1$ with respect to said sources, for example $\alpha_i=30°$.

14. The optical system according to claim 12, wherein the radiofrequency beam emitted by said first source is a TEM electromagnetic wave having a given phase, and wherein the device for controlling radiofrequency beams is defined in a coordinate system (X,Y,Z), the device for controlling radiofrequency beams generally extending in a plane (X,Y), the device for controlling radiofrequency beams comprising a set of multiple cells, said device for controlling radiofrequency beams being configured to modify said phase in the plane (X,Y).

15. A method for manufacturing the device for controlling radiofrequency beams according to claim 1, wherein the device is completely metal, and the manufacturing method uses at least one 3D printing technique.

16. The method for manufacturing the device for controlling radiofrequency beams according to claim 9, said device comprising two faces defined in the plane (X,Y), and wherein the method comprises a first step of depositing metal layers stacked in the direction of said incline β, and then a second step of cutting at least one of the two faces of the device.

* * * * *